United States Patent
Kung et al.

(10) Patent No.: US 11,736,986 B2
(45) Date of Patent: Aug. 22, 2023

(54) METHOD AND APPARATUS FOR MOBILITY PROCEDURE REGARDING MAC RESET IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 81 days.

(21) Appl. No.: 17/410,020

(22) Filed: Aug. 24, 2021

(65) Prior Publication Data

US 2022/0078670 A1    Mar. 10, 2022

Related U.S. Application Data

(60) Provisional application No. 63/075,270, filed on Sep. 7, 2020, provisional application No. 63/075,273, filed on Sep. 7, 2020.

(51) Int. Cl.
| | |
|---|---|
| *H04W 36/00* | (2009.01) |
| *H04W 74/08* | (2009.01) |
| *H04W 28/02* | (2009.01) |
| *H04W 76/30* | (2018.01) |
| *H04W 36/04* | (2009.01) |

(52) U.S. Cl.
CPC ... *H04W 36/0005* (2013.01); *H04W 28/0278* (2013.01); *H04W 36/04* (2013.01); *H04W 74/0833* (2013.01); *H04W 76/30* (2018.02)

(58) Field of Classification Search
CPC ............. H04W 36/0005; H04W 36/04; H04W 36/0069; H04W 36/08; H04W 36/0055; H04W 28/0278; H04W 74/0833; H04W 76/30; H04W 76/19; H04W 76/27; H04W 24/02; H04W 72/20; H04W 80/02
See application file for complete search history.

(56) References Cited

U.S. PATENT DOCUMENTS

| | | | |
|---|---|---|---|
| 9,756,678 B2 | 9/2017 | Yamada | |
| 10,292,081 B2 * | 5/2019 | Lee | H04W 36/18 |
| 2017/0055283 A1 * | 2/2017 | Shrivastava | H04W 76/28 |
| 2018/0352481 A1 * | 12/2018 | Taguchi | H04W 36/0011 |

(Continued)

FOREIGN PATENT DOCUMENTS

EP    3562209 A1    10/2019

*Primary Examiner* — Robert C Scheibel
(74) *Attorney, Agent, or Firm* — Cooper Legal Group LLC

(57) ABSTRACT

A method and apparatus are disclosed. In an example from the perspective of a User Equipment (UE), the UE receives a first Radio Resource Control (RRC) message indicative of switching a Primary Cell (PCell) of the UE to a first cell, wherein the first RRC message is indicative of a first configuration of the first cell. The UE resets a Medium Access Control (MAC) entity associated with the PCell of the UE in response to receiving the first RRC message. The UE receives a second RRC message indicative of a second configuration of a second cell. The UE receives a signaling indicative of initiating a mobility procedure to switch the PCell of the UE to the second cell. The signaling includes a Physical Downlink Control Channel (PDCCH) signaling and/or a MAC Control Element (CE). The UE does not reset the MAC entity associated with the PCell of the UE in response to the mobility procedure.

20 Claims, 14 Drawing Sheets

(56) References Cited

U.S. PATENT DOCUMENTS

| | | | | |
|---|---|---|---|---|
| 2019/0380081 A1* | 12/2019 | Chang | .................. | H04W 36/18 |
| 2020/0015132 A1* | 1/2020 | Liu | .................. | H04W 36/0005 |
| 2021/0345195 A1* | 11/2021 | Shi | ..................... | H04W 12/037 |

* cited by examiner

1000

METHOD AND APPARATUS FOR MOBILITY PROCEDURE REGARDING MAC RESET IN A WIRELESS COMMUNICATION SYSTEM

CROSS-REFERENCE TO RELATED APPLICATIONS

The present application claims the benefit of U.S. Provisional Patent Application Ser. No. 63/075,273 filed on Sep. 7, 2020, the entire disclosure of which is incorporated herein in its entirety by reference. The present application also claims the benefit of U.S. Provisional Patent Application Ser. No. 63/075,270 filed on Sep. 7, 2020, the entire disclosure of which is incorporated herein in its entirety by reference.

FIELD

This disclosure generally relates to wireless communication networks, and more particularly, to a method and apparatus for mobility procedure regarding Medium Access Control (MAC) reset in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives a first Radio Resource Control (RRC) message indicative of switching a Primary Cell (PCell) of the UE to a first cell, wherein the first RRC message is indicative of a first configuration of the first cell. The UE resets a Medium Access Control (MAC) entity associated with the PCell of the UE in response to receiving the first RRC message. The UE receives a second RRC message indicative of a second configuration of a second cell. The UE receives a signaling indicative of initiating a mobility procedure to switch the PCell of the UE to the second cell. The signaling comprises a Physical Downlink Control Channel (PDCCH) signaling and/or a MAC Control Element (CE). The UE does not reset the MAC entity associated with the PCell of the UE in response to the mobility procedure.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193133 New WID: Further enhancements on MIMO for NR; 3GPP TS 38.300, V16.0.0, NR and NG-RAN Overall Description; 3GPP TS 38.321, V16.0.0, Medium Access Control (MAC) protocol specification; 3GPP TS 38.331, V16.1.0, Radio Resource Control (RRC) protocol specification; 3GPP TS 38.212 V16.2.0; 3GPP TS 38.214 V16.2.0. The standards and documents listed above are hereby expressly incorporated by reference in their entirety.

Figure 1:
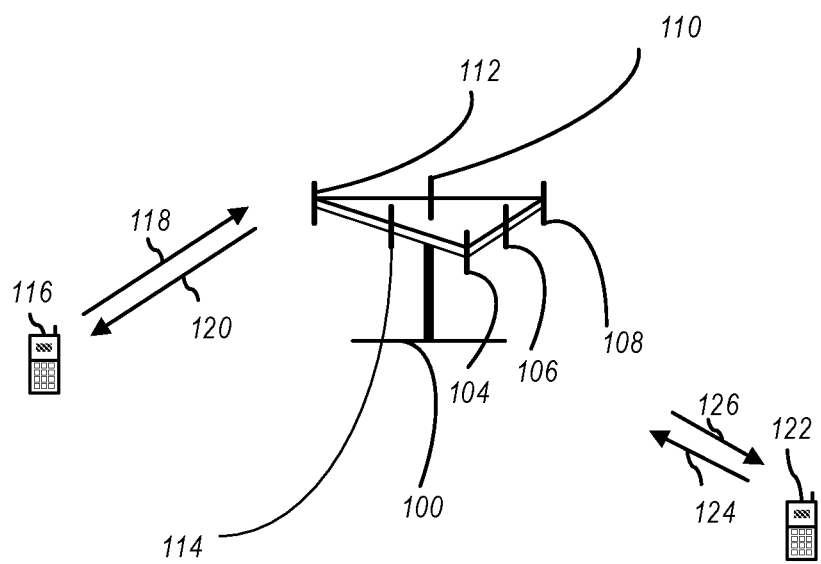
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
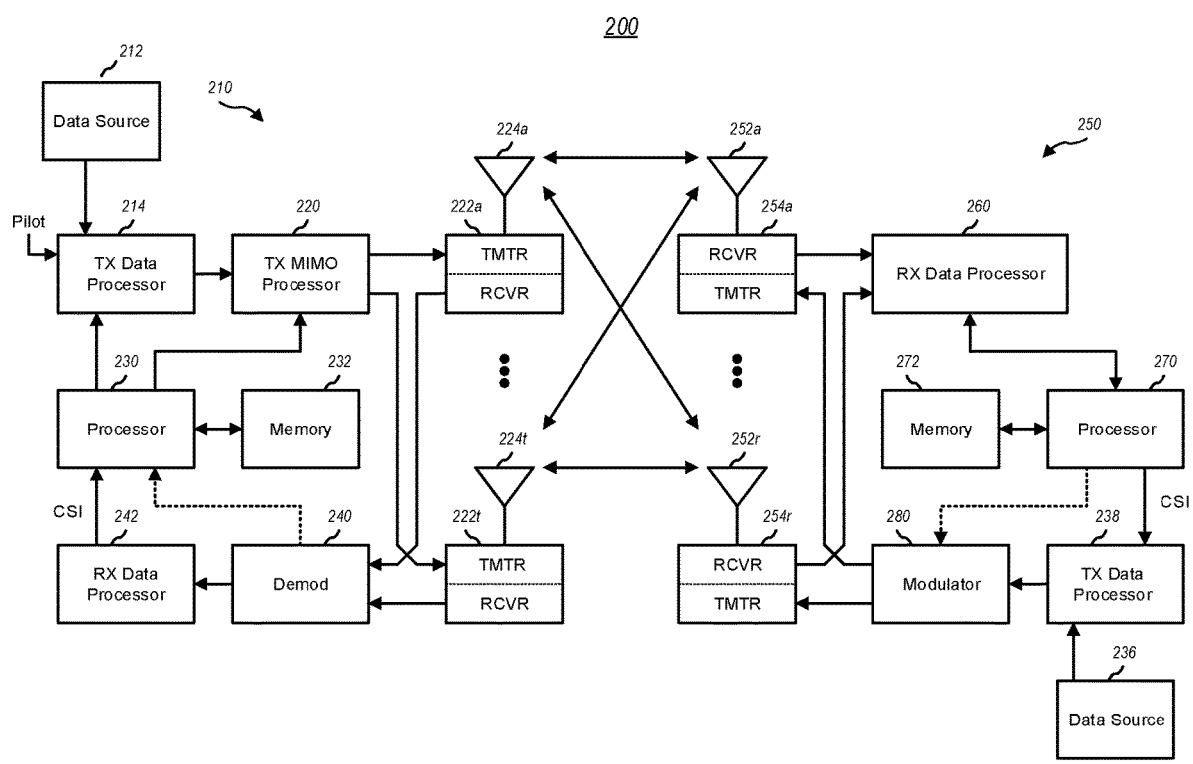
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
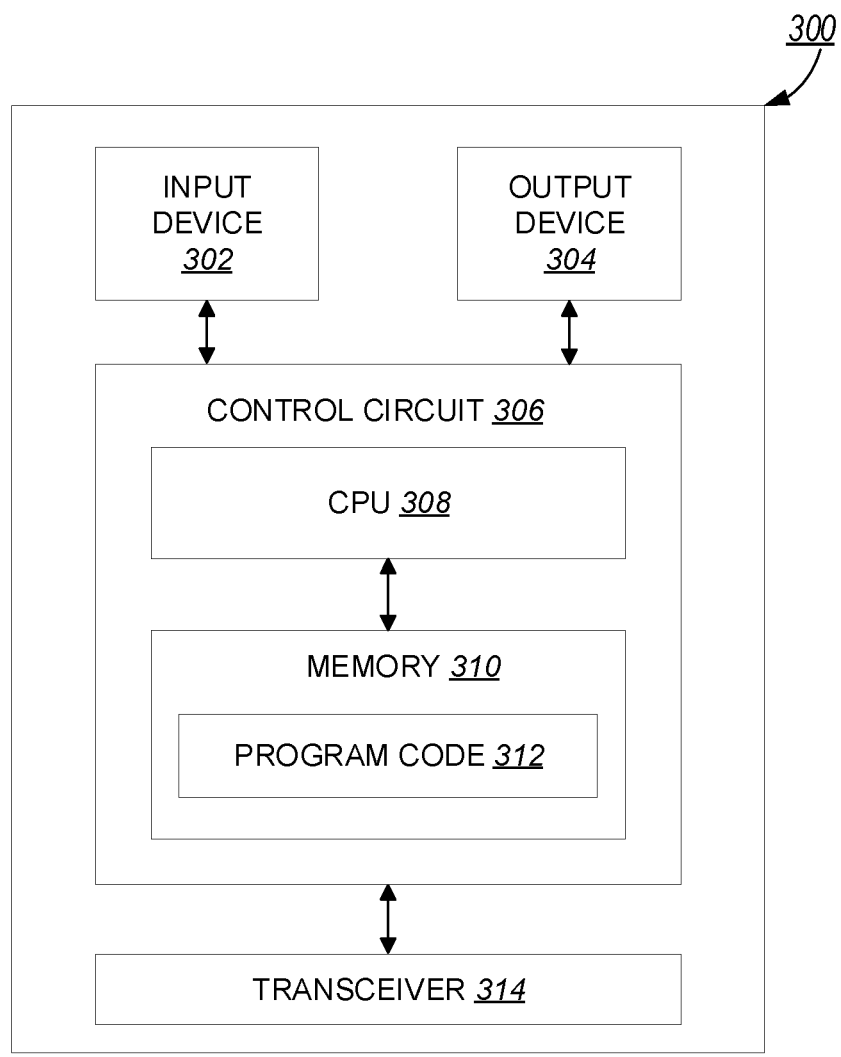
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
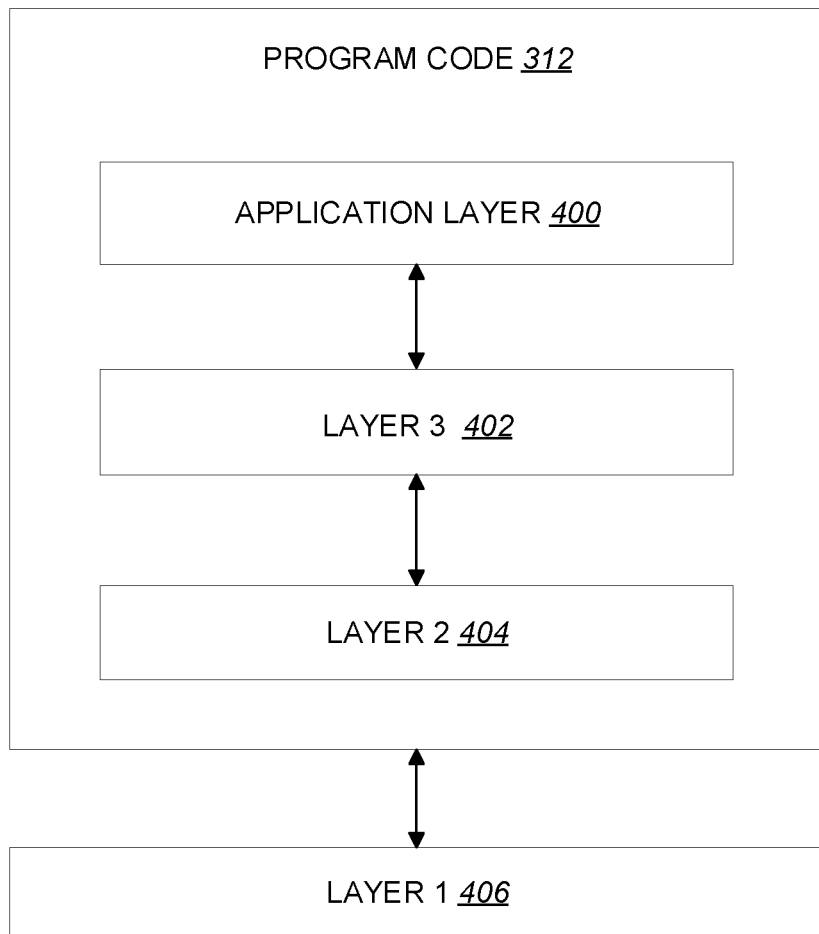
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In work item description (WID) of further enhancements of multiple-input and multiple-output (MIMO) for NR in RP-193133 New WID, Layer 1 (L1)/Layer 2 (L2)-centric inter-cell mobility may be considered to be an objective. One or more parts of RP-193133 New WID are quoted below:

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective

4.1 Objective of SI or Core Part WI or Testing Part WI

The work item aims to specify the further enhancements identified for NR MIMO. The detailed objectives are as follows:
Extend specification support in the following areas [RAN1]
1. Enhancement on multi-beam operation, mainly targeting FR2 while also applicable to FR1:
    a. Identify and specify features to facilitate more efficient (lower latency and overhead) DL/UL beam management to support higher intra- and L1/L2-centric inter-cell mobility and/or a larger number of configured TCI states:
        i. Common beam for data and control transmission/reception for DL and UL, especially for intra-band CA
        ii. Unified TCI framework for DL and UL beam indication
        iii. Enhancement on signaling mechanisms for the above features to improve latency and efficiency with more usage of dynamic control signaling (as opposed to RRC)
    b. Identify and specify features to facilitate UL beam selection for UEs equipped with multiple panels, considering UL coverage loss mitigation due to MPE, based on UL beam indication with the unified TCI framework for UL fast panel selection
2. Enhancement on the support for multi-TRP deployment, targeting both FR1 and FR2:
    a. Identify and specify features to improve reliability and robustness for channels other than PDSCH (that is, PDCCH, PUSCH, and PUCCH) using multi-TRP and/or multi-panel, with Rel.16 reliability features as the baseline
    b. Identify and specify QCL/TCI-related enhancements to enable inter-cell multi-TRP operations, assuming multi-DCI based multi-PDSCH reception
    c. Evaluate and, if needed, specify beam-management-related enhancements for simultaneous multi-TRP transmission with multi-panel reception
    d. Enhancement to support HST-SFN deployment scenario:
        i. Identify and specify solution(s) on QCL assumption for DMRS, e.g. multiple QCL assumptions for the same DMRS port(s), targeting DL-only transmission
        ii. Evaluate and, if the benefit over Rel.16 HST enhancement baseline is demonstrated, specify QCL/QCL-like relation (including applicable type(s) and the associated requirement) between DL and UL signal by reusing the unified TCI framework
3. Enhancement on SRS, targeting both FR1 and FR2:
    a. Identify and specify enhancements on aperiodic SRS triggering to facilitate more flexible triggering and/or DCI overhead/usage reduction
    b. Specify SRS switching for up to 8 antennas (e.g., xTyR, x={1, 2, 4} and y={6, 8})

c. Evaluate and, if needed, specify the following mechanism(s) to enhance SRS capacity and/or coverage: SRS time bundling, increased SRS repetition, partial sounding across frequency 4. Enhancement on CSI measurement and reporting:
   a. Evaluate and, if needed, specify CSI reporting for DL multi-TRP and/or multi-panel transmission to enable more dynamic channel/interference hypotheses for NCJT, targeting both FR1 and FR2
   b. Evaluate and, if needed, specify Type II port selection codebook enhancement (based on Rel.15/16 Type II port selection) where information related to angle(s) and delay(s) are estimated at the gNB based on SRS by utilizing DL/UL reciprocity of angle and delay, and the remaining DL CSI is reported by the UE, mainly targeting FDD FR1 to achieve better trade-off among UE complexity, performance and reporting overhead Investigate if the requirements on link recovery procedure is suitable for FR2 serving cells [RAN4]

Specify higher layer support of enhancements listed above [RAN2]

Specify core requirements associated with the items specified by RAN1 [RAN4]

A description of reconfiguration with sync for NR is introduced in 3GPP TS 38.300, V16.0.0. Notably, FIG. 9.2.3.2.1-1 of Section 9.2.3.2.1 of 3GPP TS 38.300, V16.0.0, entitled "Intra-AMF/UPF Handover", is reproduced herein as FIG. 5. One or more parts of 3GPP TS 38.300, V16.0.0 are quoted below:

9.2.3.2 Handover
9.2.3.2.1 C-Plane Handling

Figure 9:
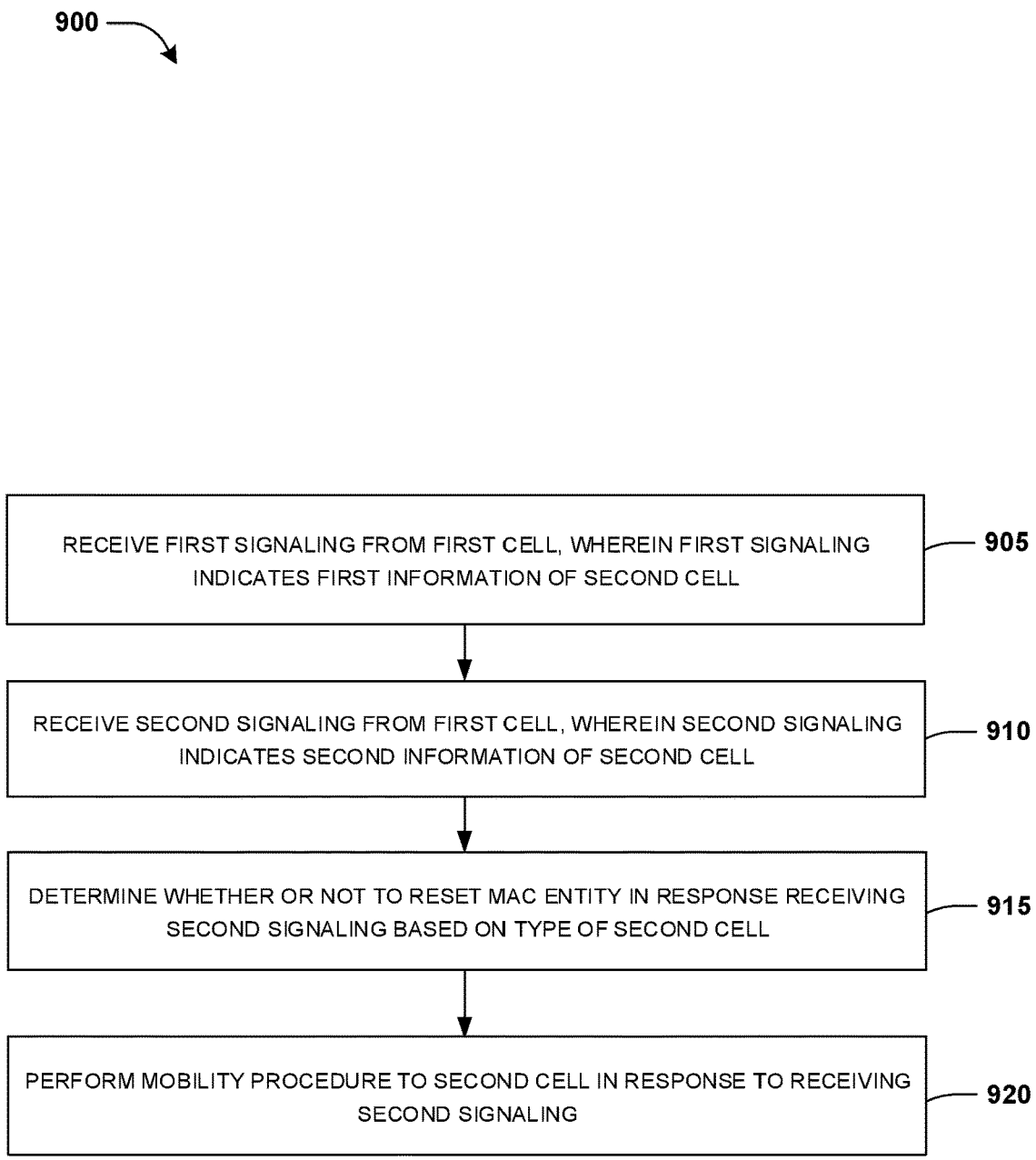
FIG. 9 is a flow chart according to one exemplary embodiment.

The intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB. The figure below depicts the basic handover scenario where neither the AMF nor the UPF changes:

FIG. 9.2.3.2.1-1: Intra-AMF/UPF Handover

0. The UE context within the source gNB contains information regarding roaming and access restrictions which were provided either at connection establishment or at the last TA update.
1. The source gNB configures the UE measurement procedures and the UE reports according to the measurement configuration.
2. The source gNB decides to handover the UE, based on MeasurementReport and RRM information.
3. The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information and QoS flow level QoS profile(s).

NOTE: After issuing a Handover Request, the source gNB should not reconfigure the UE, including performing Reflective QoS flow to DRB mapping.

4. Admission Control may be performed by the target gNB. Slice-aware admission control shall be performed if the slice information is sent to the target gNB. If the PDU sessions are associated with non-supported slices the target gNB shall reject such PDU Sessions.
5. The target gNB prepares the handover with L1/L2 and sends the HANDOVER REQUEST ACKNOWLEDGE to the source gNB, which includes a transparent container to be sent to the UE as an RRC message to perform the handover.
6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.
7. The source gNB sends the SN STATUS TRANSFER message to the target gNB.
8. The UE synchronises to the target cell and completes the RRC handover procedure by sending RRCReconfigurationComplete message to target gNB.
9. The target gNB sends a PATH SWITCH REQUEST message to AMF to trigger 5GC to switch the DL data path towards the target gNB and to establish an NG-C interface instance towards the target gNB.
10. 5GC switches the DL data path towards the target gNB. The UPF sends one or more "end marker" packets on the old path to the source gNB per PDU session/tunnel and then can release any U-plane/TNL resources towards the source gNB.
11. The AMF confirms the PATH SWITCH REQUEST message with the PATH SWITCH REQUEST ACKNOWLEDGE message.
12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:
   i) Common RACH configuration;
   ii) Common RACH configuration+Dedicated RACH configuration associated with SSB;

iii) Common RACH configuration+Dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

Random access procedure for NR is introduced in 3GPP TS 38.321, V16.0.0, one or more parts of which are quoted below:

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-Preambleindex different from 0b000000.

NOTE 1: If a new Random Access procedure is triggered while another is already ongoing in the MAC entity, it is up to UE implementation whether to continue with the ongoing procedure or start with the new procedure (e.g. for SI request).

RRC configures the following parameters for the Random Access procedure:
  prach-Configurationindex: the available set of PRACH occasions for the transmission of the Random Access Preamble;
  preambleReceivedTargetPower: initial Random Access Preamble power;
  rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;
  rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;
  rsrp-ThresholdSSB-SUL: an RSRP threshold for the selection between the NUL carrier and the SUL carrier;
  candidateBeamRSList: a list of reference signals (CSI-RS and/or SSB) identifying the candidate beams for recovery and the associated Random Access parameters;
  recoverySearchSpaceId: the search space identity for monitoring the response of the beam failure recovery request;
  powerRampingStep: the power-ramping factor;
  powerRampingStepHighPriority: the power-ramping factor in case of prioritized Random Access procedure;
  scalingFactorBI: a scaling factor for prioritized Random Access procedure;
  ra-PreambleIndex: Random Access Preamble;
  ra-ssb-OccasionMaskIndex: defines PRACH occasion(s) associated with an SSB in which the MAC entity may transmit a Random Access Preamble (see clause 7.4);
  ra-OccasionList: defines PRACH occasion(s) associated with a CSI-RS in which the MAC entity may transmit a Random Access Preamble;
  ra-PreambleStartIndex: the starting index of Random Access Preamble(s) for on-demand SI request;
  preambleTransMax: the maximum number of Random Access Preamble transmission;
  ssb-perRACH-OccasionAndCB-PreamblesPerSSB: defines the number of SSBs mapped to each PRACH occasion and the number of contention-based Random Access Preambles mapped to each SSB;
  if groupBconfigured is configured, then Random Access Preambles group B is configured.
    Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).
  NOTE 2: If Random Access Preambles group B is supported by the cell Random Access Preambles group B is included for each SSB.
  if Random Access Preambles group B is configured:
    ra-Msg3SizeGroupA: the threshold to determine the groups of Random Access Preambles;
    msg3-DeltaPreamble: $\Delta_{PREAMBLE\_Msg3}$ in TS 38.213 [6];
    messagePowerOffsetGroupB: the power offset for preamble selection;
    numberOfRA-PreamblesGroupA: defines the number of Random Access Preambles in Random Access Preamble group A for each SSB.
  the set of Random Access Preambles and/or PRACH occasions for SI request, if any;
  the set of Random Access Preambles and/or PRACH occasions for beam failure recovery request, if any;
  the set of Random Access Preambles and/or PRACH occasions for reconfiguration with sync, if any;
  ra-ResponseWindow: the time window to monitor RA response(s) (SpCell only);
  ra-ContentionResolutionTimer: the Contention Resolution Timer (SpCell only).

In addition, the following information for related Serving Cell is assumed to be available for UEs:
  if Random Access Preambles group B is configured:
    if the Serving Cell for the Random Access procedure is configured with supplementary uplink as specified in TS 38.331 [5], and SUL carrier is selected for performing Random Access Procedure:
      $P_{CMAX,f,c}$ of the SUL carrier as specified in TS 38.101-1 [14], TS 38.101-2 [15], and TS 38.101-3 [16].
    else:
      $P_{CMAX,f,c}$ of the NUL carrier as specified in TS 38.101-1 [14], TS 38.101-2 [15], and TS 38.101-3 [16].

The following UE variables are used for the Random Access procedure:
  PREAMBLE_INDEX;
  PREAMBLE_TRANSMISSION_COUNTER;
  PREAMBLE_POWER_RAMPING_COUNTER;
  PREAMBLE_POWER_RAMPING_STEP;
  PREAMBLE_RECEIVED_TARGET_POWER;
  PREAMBLE_BACKOFF;
  PCMAX;
  SCALING_FACTOR_BI;
  TEMPORARY_C-RNTI.

When the Random Access procedure is initiated on a Serving Cell, the MAC entity shall:
- 1> flush the Msg3 buffer;
- 1> set the PREAMBLE_TRANSMISSION_COUNTER to 1;
- 1> set the PREAMBLE_POWER_RAMPING_ COUNTER to 1;
- 1> set the PREAMBLE_BACKOFF to 0 ms;
- 1> if the carrier to use for the Random Access procedure is explicitly signalled:
  - 2> select the signalled carrier for performing Random Access procedure;
  - 2> set the PCMAX to $P_{CMAX,f,c}$ of the signalled carrier.
- 1> else if the carrier to use for the Random Access procedure is not explicitly signalled; and
- 1> if the Serving Cell for the Random Access procedure is configured with supplementary uplink as specified in TS 38.331 [5]; and
- 1> if the RSRP of the downlink pathloss reference is less than rsrp-ThresholdSSB-SUL:
  - 2> select the SUL carrier for performing Random Access procedure;
  - 2> set the PCMAX to $P_{CMAX,f,c}$ of the SUL carrier.
- 1> else:
  - 2> select the NUL carrier for performing Random Access procedure;
  - 2> set the PCMAX to $P_{CMAX,f,c}$ of the NUL carrier.
- 1> perform the BWP operation as specified in clause 5.15;
- 1> set PREAMBLE_POWER_RAMPING_STEP to powerRampingStep;
- 1> set SCALING_FACTOR_BI to 1;
- 1> if the Random Access procedure was initiated for beam failure recovery (as specified in clause 5.17); and
- 1> if beamFailureRecoveryConfig is configured for the active UL BWP of the selected carrier:
  - 2> start the beamFailureRecoveryTimer, if configured;
  - 2> apply the parameters powerRampingStep, preambleReceivedTargetPower, and preambleTransMax configured in the beamFailureRecoveryConfig;
  - 2> if powerRampingStepHighPriority is configured in the beamFailureRecoveryConfig:
    - 3> set PREAMBLE_POWER_RAMPING_STEP to the powerRampingStepHighPriority.
  - 2> else:
    - 3> set PREAMBLE_POWER_RAMPING_STEP to powerRampingStep.
  - 2> if scalingFactorBI is configured in the beamFailureRecoveryConfig:
    - 3> set SCALING_FACTOR_BI to the scalingFactorBI.
- 1> else if the Random Access procedure was initiated for handover; and
- 1> if rach-ConfigDedicated is configured for the selected carrier:
  - 2> if powerRampingStepHighPriority is configured in the rach-ConfigDedicated:
    - 3> set PREAMBLE_POWER_RAMPING_STEP to the powerRampingStepHighPriority.
  - 2> if scalingFactorBI is configured in the rach-ConfigDedicated:
    - 3> set SCALING_FACTOR_BI to the scalingFactorBI.
- 1> perform the Random Access Resource selection procedure (see clause 5.1.2).

5.1.2 Random Access Resource Selection

The MAC entity shall:
- 1> if the Random Access procedure was initiated for beam failure recovery (as specified in clause 5.17); and
- 1> if the beamFailureRecoveryTimer (in clause 5.17) is either running or not configured; and
- 1> if the contention-free Random Access Resources for beam failure recovery request associated with any of the SSBs and/or CSI-RSs have been explicitly provided by RRC; and
- 1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
  - 2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
  - 2> if CSI-RS is selected, and there is no ra-PreambleIndex associated with the selected CSI-RS:
    - 3> set the PREAMBLE_INDEX to a ra-PreambleIndex corresponding to the SSB in candidateBeamRSList which is quasi-colocated with the selected CSI-RS as specified in TS 38.214 [7].
  - 2> else:
    - 3> set the PREAMBLE_INDEX to a ra-PreambleIndex corresponding to the selected SSB or CSI-RS from the set of Random Access Preambles for beam failure recovery request.
- 1> else if the ra-PreambleIndex has been explicitly provided by PDCCH; and
- 1> if the ra-PreambleIndex is not 0b000000:
  - 2> set the PREAMBLE_INDEX to the signalled ra-PreambleIndex;
  - 2> select the SSB signalled by PDCCH.
- 1> else if the contention-free Random Access Resources associated with SSBs have been explicitly provided in rach-ConfigDedicated and at least one SSB with SS-RSRP above rsrp-ThresholdSSB amongst the associated SSBs is available:
  - 2> select an SSB with SS-RSRP above rsrp-ThresholdSSB amongst the associated SSBs;
  - 2> set the PREAMBLE_INDEX to a ra-PreambleIndex corresponding to the selected SSB.
- 1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
  - 2> select a CSI-RS with CSI-RSRP above rsrp-ThresholdCSI-RS amongst the associated CSI-RSs;
  - 2> set the PREAMBLE_INDEX to a ra-PreambleIndex corresponding to the selected CSI-RS.
- 1> else if the Random Access procedure was initiated for SI request (as specified in TS 38.331 [5]); and
- 1> if the Random Access Resources for SI request have been explicitly provided by RRC:
  - 2> if at least one of the SSBs with SS-RSRP above rsrp-ThresholdSSB is available:
    - 3> select an SSB with SS-RSRP above rsrp-ThresholdSSB.
  - 2> else:
    - 3> select any SSB.
  - 2> select a Random Access Preamble corresponding to the selected SSB, from the Random Access Preamble(s) determined according to ra-PreambleStartIndex as specified in TS 38.331 [5];

2> set the PREAMBLE_INDEX to selected Random Access Preamble.
1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> if Msg3 has not yet been transmitted:
    3> if Random Access Preambles group B is configured:
      4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)−preambleReceivedTargetPower−msg3-DeltaPreamble−messagePowerOffsetGroupB; or
      4> if the Random Access procedure was initiated for the CCCH logical channel and the CCCH SDU size plus MAC subheader is greater than ra-Msg3SizeGroupA:
        5> select the Random Access Preambles group B.
      4> else:
        5> select the Random Access Preambles group A.
    3> else:
      4> select the Random Access Preambles group A.
  2> else (i.e. Msg3 is being retransmitted):
    3> select the same group of Random Access Preambles as was used for the Random Access Preamble transmission attempt corresponding to the first transmission of Msg3.
  2> select a Random Access Preamble randomly with equal probability from the Random Access Preambles associated with the selected SSB and the selected Random Access Preambles group.
  2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
  2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).
1> else if an SSB is selected above:
  2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
  2> if there is no contention-free Random Access Resource associated with the selected CSI-RS:
    3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
  2> else:
    3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
NOTE: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.3 Random Access Preamble Transmission

The MAC entity shall, for each Random Access Preamble:
1> if PREAMBLE_TRANSMISSION_COUNTER is greater than one; and
1> if the notification of suspending power ramping counter has not been received from lower layers; and
1> if SSB or CSI-RS selected is not changed from the selection in the last Random Access Preamble transmission:
  2> increment PREAMBLE_POWER_RAMPING_COUNTER by 1.
1> select the value of DELTA_PREAMBLE according to clause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX and PREAMBLE_RECEIVED_TARGET_POWER.

The RA-RNTI associated with the PRACH occasion in which the Random Access Preamble is transmitted, is computed as:

$$\text{RA-RNTI} = 1 + s\_id + 14 \times t\_id + 14 \times 80 \times f\_id + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ specified in clause 5.3.2 in TS 38.211 [8], f_id is the index of the PRACH occasion in the frequency domain (0≤f_id<8), and ul_carrier_id is the UL carrier used for Random Access Preamble transmission (0 for NUL carrier, and 1 for SUL carrier).

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:
   2> start the ra-Response Window configured in BeamFailureRecoveryConfig at the first PDCCH occasion as specified in TS 38.213 [6] from the end of the Random Access Preamble transmission;
   2> monitor for a PDCCH transmission on the search space indicated by recoverySearchSpaceId of the SpCell identified by the C-RNTI while ra-ResponseWindow is running.
1> else:
   2> start the ra-Response Window configured in RACH-ConfigCommon at the first PDCCH occasion as specified in TS 38.213 [6] from the end of the Random Access Preamble transmission;
   2> monitor the PDCCH of the SpCell for Random Access Response(s) identified by the RA-RNTI while the ra-ResponseWindow is running
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
   2> consider the Random Access procedure successfully completed.
1> else if a downlink assignment has been received on the PDCCH for the RA-RNTI and the received TB is successfully decoded:
   2> if the Random Access Response contains a MAC subPDU with Backoff Indicator:
     3> set the PREAMBLE_BACKOFF to value of the BI field of the MAC subPDU using Table 7.2-1, multiplied with SCALING_FACTOR_BI.
   2> else:
     3> set the PREAMBLE_BACKOFF to 0 ms.
   2> if the Random Access Response contains a MAC subPDU with Random Access Preamble identifier corresponding to the transmitted PREAMBLE_INDEX (see clause 5.1.3):
     3> consider this Random Access Response reception successful.
     2> if the Random Access Response reception is considered successful:
        3> if the Random Access Response includes a MAC subPDU with RAPID only:
           4> consider this Random Access procedure successfully completed;
           4> indicate the reception of an acknowledgement for SI request to upper layers.
        3> else:
           4> apply the following actions for the Serving Cell where the Random Access Preamble was transmitted:
               5> process the received Timing Advance Command (see clause 5.2);
               5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
               5> if the Random Access procedure for an SCell is performed on uplink carrier where puschConfig is not configured:
                   6> ignore the received UL grant.
               5> else:
                   6> process the received UL grant value and indicate it to the lower layers.
           4> if the Random Access Preamble was not selected by the MAC entity among the contention-based Random Access Preamble(s):
               5> consider the Random Access procedure successfully completed.
           4> else:
               5> set the TEMPORARY_C-RNTI to the value received in the Random Access Response;
               5> if this is the first successfully received Random Access Response within this Random Access procedure:
                   6> if the transmission is not being made for the CCCH logical channel:
                       7> indicate to the Multiplexing and assembly entity to include a C-RNTI MAC CE in the subsequent uplink transmission.
                   6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the UE behavior is not defined.

[ . . . ]

5.1.5 Contention Resolution

Once Msg3 is transmitted, the MAC entity shall:

1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
   2> if the C-RNTI MAC CE was included in Msg3:
     3> if the Random Access procedure was initiated for beam failure recovery (as specified in clause 5.17) and the PDCCH transmission is addressed to the C-RNTI; or 3> if the Random Access procedure was initiated by a PDCCH order and the PDCCH transmission is addressed to the C-RNTI; or
3> if the Random Access procedure was initiated by the MAC sublayer itself or by the RRC sublayer and the PDCCH transmission is addressed to the C-RNTI and contains a UL grant for a new transmission:
   4> consider this Contention Resolution successful;
   4> stop ra-ContentionResolutionTimer;
   4> discard the TEMPORARY_C-RNTI;
   4> consider this Random Access procedure successfully completed.
2> else if the CCCH SDU was included in Msg3 and the PDCCH transmission is addressed to its TEMPORARY_C-RNTI:
   3> if the MAC PDU is successfully decoded:
     4> stop ra-ContentionResolutionTimer;
     4> if the MAC PDU contains a UE Contention Resolution Identity MAC CE; and
     4> if the UE Contention Resolution Identity in the MAC CE matches the CCCH SDU transmitted in Msg3:
       5> consider this Contention Resolution successful and finish the disassembly and demultiplexing of the MAC PDU;
       5> if this Random Access procedure was initiated for SI request:
         6> indicate the reception of an acknowledgement for SI request to upper layers.
       5> else:
         6> set the C-RNTI to the value of the TEMPORARY_C-RNTI;
       5> discard the TEMPORARY_C-RNTI;
       5> consider this Random Access procedure successfully completed.
     4> else:
       5> discard the TEMPORARY_C-RNTI;
       5> consider this Contention Resolution not successful and discard the successfully decoded MAC PDU.

[ . . . ]

5.1.6 Completion of the Random Access Procedure

Upon completion of the Random Access procedure, the MAC entity shall:
1> discard explicitly signalled contention-free Random Access Resources except contention-free Random Access Resources for beam failure recovery request, if any;
1> flush the HARQ buffer used for transmission of the MAC PDU in the Msg3 buffer.

5.2 Maintenance of Uplink Time Alignment

RRC configures the following parameters for the maintenance of UL time alignment:
   timeAlignmentTimer (per TAG) which controls how long the MAC entity considers the Serving Cells belonging to the associated TAG to be uplink time aligned.
The MAC entity shall:
1> when a Timing Advance Command MAC CE is received, and if an $N_{TA}$ (as defined in TS 38.211 [8]) has been maintained with the indicated TAG:
   2> apply the Timing Advance Command for the indicated TAG;
   2> start or restart the timeAlignmentTimer associated with the indicated TAG.
1> when a Timing Advance Command is received in a Random Access Response message for a Serving Cell belonging to a TAG or in a MSGB for an SpCell:
   2> if the Random Access Preamble was not selected by the MAC entity among the contention-based Random Access Preamble:
     3> apply the Timing Advance Command for this TAG;
     3> start or restart the timeAlignmentTimer associated with this TAG.
   2> else if the timeAlignmentTimer associated with this TAG is not running:
     3> apply the Timing Advance Command for this TAG;
     3> start the timeAlignmentTimer associated with this TAG;
     3> when the Contention Resolution is considered not successful as described in clause 5.1.5; or
     3> when the Contention Resolution is considered successful for SI request as described in clause 5.1.5, after transmitting HARQ feedback for MAC PDU including UE Contention Resolution Identity MAC CE:
       4> stop timeAlignmentTimer associated with this TAG.
   2> else:
     3> ignore the received Timing Advance Command
1> when an Absolute Timing Advance Command is received in response to a MSGA transmission including C-RNTI MAC CE as specified in clause 5.1.4a:
   2> apply the Timing Advance Command for PTAG;
   2> start or restart the timeAlignmentTimer associated with PTAG.
1> when a timeAlignmentTimer expires:
   2> if the timeAlignmentTimer is associated with the PTAG:
     3> flush all HARQ buffers for all Serving Cells;
     3> notify RRC to release PUCCH for all Serving Cells, if configured;
     3> notify RRC to release SRS for all Serving Cells, if configured;
     3> clear any configured downlink assignments and configured uplink grants;
     3> clear any PUSCH resource for semi-persistent CSI reporting;
     3> consider all running timeAlignmentTimers as expired;
     3> maintain $N_{TA}$ (defined in TS 38.211 [8]) of all TAGs.
   2> else if the timeAlignmentTimer is associated with an STAG, then for all Serving Cells belonging to this TAG:
     3> flush all HARQ buffers;
     3> notify RRC to release PUCCH, if configured;
     3> notify RRC to release SRS, if configured;
     3> clear any configured downlink assignments and configured uplink grants;
     3> clear any PUSCH resource for semi-persistent CSI reporting;
     3> maintain $N_{TA}$ (defined in TS 38.211 [8]) of this TAG.

[ . . . ]

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure (see clause 5.21), at most one PUCCH resource for SR is configured per BWP. Each SR configuration corresponds to one or more logical channels or to SCell beam failure recovery and/or to consistent LBT failure. Each logical channel, and consistent LBT failure, may be mapped to zero or one SR configuration, which is configured by RRC. The SR configuration of the logical channel that triggered a BSR other than Pre-emptive BSR (clause 5.4.5) or the SCell beam failure recovery or the consistent LBT failure (clause 5.21) (if such a configuration exists) is considered as corresponding SR configuration for the triggered SR. Any SR configuration may be used for an SR triggered by Pre-emptive BSR (clause 5.4.5).

RRC configures the following parameters for the scheduling request procedure:
  sr-ProhibitTimer (per SR configuration);
  sr-TransMax (per SR configuration).

The following UE variables are used for the scheduling request procedure:
  SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

Except for SCell beam failure recovery, all pending SR(s) for BSR triggered according to the BSR procedure (clause 5.4.5) prior to the MAC PDU assembly shall be cancelled and each respective sr-ProhibitTimer shall be stopped when the MAC PDU is transmitted, regardless of LBT failure indication from lower layers, and this PDU includes a Long or Short BSR MAC CE which contains buffer status up to (and including) the last event that triggered a BSR (see clause 5.4.5) prior to the MAC PDU assembly. Except for SCell beam failure recovery, all pending SR(s) for BSR triggered according to the BSR procedure (clause 5.4.5) shall be cancelled and each respective sr-ProhibitTimer shall be stopped when the UL grant(s) can accommodate all pending data available for transmission. Pending SR triggered prior to the MAC PDU assembly for beam failure recovery of an SCell shall be cancelled when the MAC PDU is transmitted and this PDU includes an SCell BFR MAC CE or truncated SCell BFR MAC CE which contains beam failure recovery information of that SCell. If all the SR(s) triggered for SCell beam failure recovery are cancelled the MAC entity shall stop sr-ProhibitTimer of corresponding SR configuration.

The MAC entity shall for each pending SR triggered by consistent LBT failure:
  1> if a MAC PDU is transmitted, regardless of LBT failure indication from lower layers, and the MAC PDU includes an LBT failure MAC CE that indicates consistent LBT failure for the Serving Cell that triggered this SR; or
  1> if the corresponding consistent LBT failure is cancelled (see clause 5.21):
    2> cancel the pending SR and stop the corresponding sr-ProhibitTimer.

Only PUCCH resources on a BWP which is active at the time of SR transmission occasion are considered valid.

As long as at least one SR is pending, the MAC entity shall for each pending SR:
  1> if the MAC entity has no valid PUCCH resource configured for the pending SR:
    2> initiate a Random Access procedure (see clause 5.1) on the SpCell and cancel the pending SR.
  1> else, for the SR configuration corresponding to the pending SR:
    2> when the MAC entity has an SR transmission occasion on the valid PUCCH resource for SR configured; and
    2> if sr-ProhibitTimer is not running at the time of the SR transmission occasion; and
    2> if the PUCCH resource for the SR transmission occasion does not overlap with a measurement gap:
      3> if the PUCCH resource for the SR transmission occasion overlaps with neither a UL-SCH resource nor an SL-SCH resource; or
      3> if the MAC entity is configured with lch-basedPrioritization, and the PUCCH resource for the SR transmission occasion overlaps with any UL-SCH resource(s), and the priority of the logical channel that triggered SR is higher than the priority of the uplink grant(s) for any UL-SCH resource(s) where the priority of the uplink grant is determined as specified in clause 5.4.1; or
      3> if a SL-SCH resource overlaps with the PUCCH resource for the SR transmission occasion for the pending SR triggered as specified in clause 5.4.5, and the MAC entity is not able to perform this SR transmission simultaneously with the transmission of the SL-SCH resource, and either transmission on the SL-SCH resource is not prioritized as described in clause 5.22.1.3.1 or the priority value of the logical channel that triggered SR is lower than ul-Prioritizationthres, if configured; or
      3> if a SL-SCH resource overlaps with the PUCCH resource for the SR transmission occasion for the pending SR triggered as specified in clause 5.22.1.5, and the MAC entity is not able to perform this SR transmission simultaneously with the transmission of the SL-SCH resource, and the priority of the triggered SR determined as specified in clause 5.22.1.5 is higher than the priority of the MAC PDU determined as specified in clause 5.22.1.3.1 for the SL-SCH resource:
        4> the other overlapping uplink grant(s), if any, is a de-prioritized uplink grant;
        4> if SR_COUNTER<sr-TransMax:
          5> instruct the physical layer to signal the SR on one valid PUCCH resource for SR;
          5> if LBT failure indication is not received from lower layers:
          5> increment SR_COUNTER by 1;
          ♦ 6> start the sr-ProhibitTimer.
        4> else:
          5> notify RRC to release PUCCH for all Serving Cells;
          5> notify RRC to release SRS for all Serving Cells;
          5> clear any configured downlink assignments and uplink grants;
          5> clear any PUSCH resources for semi-persistent CSI reporting;
          5> initiate a Random Access procedure (see clause 5.1) on the SpCell and cancel all pending SRs.

[ . . . ]

5.4.5 Buffer Status Reporting

The Buffer Status reporting (BSR) procedure is used to provide the serving gNB with information about UL data volume in the MAC entity.

RRC configures the following parameters to control the BSR:
- periodicBSR-Timer;
- retxBSR-Timer;
- logicalChannelSR-DelayTimerApplied;
- logicalChannelSR-DelayTimer;
- logicalChannelSR-Mask;
- logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR shall be triggered if any of the following events occur:
- UL data, for a logical channel which belongs to an LCG, becomes available to the MAC entity; and either
  - this UL data belongs to a logical channel with higher priority than the priority of any logical channel containing available UL data which belong to any LCG; or
  - none of the logical channels which belong to an LCG contains any available UL data.

in which case the BSR is referred below to as 'Regular BSR';
- UL resources are allocated and number of padding bits is equal to or larger than the size of the Buffer Status Report MAC CE plus its subheader, in which case the BSR is referred below to as 'Padding BSR';
- retxBSR-Timer expires, and at least one of the logical channels which belong to an LCG contains UL data, in which case the BSR is referred below to as 'Regular BSR';
- periodicBSR-Timer expires, in which case the BSR is referred below to as 'Periodic BSR'.

NOTE 1: When Regular BSR triggering events occur for multiple logical channels simultaneously, each logical channel triggers one separate Regular BSR.

For Regular BSR, the MAC entity shall:
- 1> if the BSR is triggered for a logical channel for which logicalChannelSR-DelayTimerApplied with value true is configured by upper layers:
  - 2> start or restart the logicalChannelSR-DelayTimer.
- 1> else:
  - 2> if running, stop the logicalChannelSR-DelayTimer.

For Regular and Periodic BSR, the MAC entity shall:
- 1> if more than one LCG has data available for transmission when the MAC PDU containing the BSR is to be built:
  - 2> report Long BSR for all LCGs which have data available for transmission.
- 1> else:
  - 2> report Short BSR.

For Padding BSR, the MAC entity shall:
- 1> if the number of padding bits is equal to or larger than the size of the Short BSR plus its subheader but smaller than the size of the Long BSR plus its subheader:
  - 2> if more than one LCG has data available for transmission when the BSR is to be built:
    - 3> if the number of padding bits is equal to the size of the Short BSR plus its subheader:
      - 4> report Short Truncated BSR of the LCG with the highest priority logical channel with data available for transmission.
    - 3> else:
      - 4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
  - 2> else:
    - 3> report Short BSR.
- 1> else if the number of padding bits is equal to or larger than the size of the Long BSR plus its subheader:
  - 2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity shall:
- 1> if the Buffer Status reporting procedure determines that at least one BSR has been triggered and not cancelled:
  - 2> if UL-SCH resources are available for a new transmission and the UL-SCH resources can accommodate the BSR MAC CE plus its subheader as a result of logical channel prioritization:
    - 3> instruct the Multiplexing and Assembly procedure to generate the BSR MAC CE(s);
    - 3> start or restart periodicBSR-Timer except when all the generated BSRs are long or short Truncated BSRs;
    - 3> start or restart retxBSR-Timer.
  - 2> if a Regular BSR has been triggered and logicalChannelSR-DelayTimer is not running:
    - 3> if there is no UL-SCH resource available for a new transmission; or
    - 3> if the MAC entity is configured with configured uplink grant(s) and the Regular BSR was triggered for a logical channel for which logicalChannelSR-Mask is set to false; or
    - 3> if the UL-SCH resources available for a new transmission do not meet the LCP mapping restrictions (see clause 5.4.3.1) configured for the logical channel that triggered the BSR:
      - 4> trigger a Scheduling Request.

NOTE 2: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

[ . . . ]

5.12 MAC Reset

If a reset of the MAC entity is requested by upper layers, the MAC entity shall:
- 1> initialize Bj for each logical channel to zero;
- 1> stop (if running) all timers;
- 1> consider all timeAlignmentTimers as expired and perform the corresponding actions in clause 5.2;
- 1> set the NDIs for all uplink HARQ processes to the value 0;

1> sets the NDIs for all HARQ process IDs to the value 0 for monitoring PDCCH in Sidelink resource allocation mode 1;
1> stop, if any, ongoing RACH procedure;
1> discard explicitly signalled contention-free Random Access Resources for 4-step RA type and 2-step RA type, if any;
1> flush Msg3 buffer;
1> flush MSGA buffer;
1> cancel, if any, triggered Scheduling Request procedure;
1> cancel, if any, triggered Buffer Status Reporting procedure;
1> cancel, if any, triggered Power Headroom Reporting procedure;
1> cancel, if any, triggered consistent LBT failure;
1> cancel, if any, triggered Sidelink Buffer Status Reporting procedure;
1> flush the soft buffers for all DL HARQ processes;
1> for each DL HARQ process, consider the next received transmission for a TB as the very first transmission;
1> release, if any, Temporary C-RNTI;
1> reset all BFI_COUNTERs;
1> reset LBT_COUNTER.

If a Sidelink specific reset of the MAC entity is requested for a PC5-RRC connection by upper layers, the MAC entity shall:
1> flush the soft buffers for all Sidelink processes for all TB(s) associated to the PC5-RRC connection;
1> cancel, if any, triggered Scheduling Request procedure only associated to the PC5-RRC connection;
1> cancel, if any, triggered Sidelink Buffer Status Reporting procedure only associated to the PC5-RRC connection.

5.22.1.6 Buffer Status Reporting

The Sidelink Buffer Status reporting (SL-BSR) procedure is used to provide the serving gNB with information about SL data volume in the MAC entity.

RRC configures the following parameters to control the SL-BSR:
  periodicBSR-Timer;
  retxBSR-Timer;
  sl-logicalChannelSR-DelayTimerApplied;
  logicalChannelSR-DelayTimer;
  sl-logicalChannelGroup.

Each logical channel which belongs to a Destination is allocated to an LCG as specified in TS 38.331 [5] or TS 36.331 [21]. The maximum number of LCGs is eight.

The MAC entity determines the amount of SL data available for a logical channel according to the data volume calculation procedure in TSs 38.322 [3] and 38.323 [4].

A SL-BSR shall be triggered if any of the following events occur:
  1> if the MAC entity has been configured with Sidelink resource allocation mode 1:
    2> SL data, for a logical channel of a Destination, becomes available to the MAC entity; and either
      3> this SL data belongs to a logical channel with higher priority than the priorities of the logical channels containing available SL data which belong to any LCG belonging to the same Destination; or
      3> none of the logical channels which belong to an LCG belonging to the same Destination contains any available SL data.
    in which case the SL-BSR is referred below to as 'Regular SL-BSR';
    2> UL resources are allocated and number of padding bits remaining after a Padding BSR has been triggered is equal to or larger than the size of the SL-BSR MAC CE plus its subheader, in which case the SL-BSR is referred below to as 'Padding SL-BSR';
    2> retxBSR-Timer expires, and at least one of the logical channels which belong to an LCG contains SL data, in which case the SL-BSR is referred below to as 'Regular SL-BSR';
    2> periodicBSR-Timer expires, in which case the SL-BSR is referred below to as 'Periodic SL-BSR'.
  1> else:
    2> Sidelink resource allocation mode 1 is configured by RRC and SL data is available for transmission in the RLC entity or in the PDCP entity, in which case the Sidelink BSR is referred below to as "Regular Sidelink BSR".

For Regular SL-BSR, the MAC entity shall:
  1> if the SL-BSR is triggered for a logical channel for which sl-logicalChannelSR-DelayTimerApplied with value true is configured by upper layers:
    2> start or restart the logicalChannelSR-DelayTimer.
  1> else:
    2> if running, stop the logicalChannelSR-DelayTimer.

For Regular and Periodic SL-BSR, the MAC entity shall:
  1> if sl-PrioritizationThres is configured and the value of the highest priority of the logical channels that belong to any LCG and contain SL data for any Destination is lower than sl-PrioritizationThres; and
  1> if either ul-PrioritizationThres is not configured or ul-PrioritizationThres is configured and the value of the highest priority of the logical channels that belong to any LCG and contain UL data is equal to or higher than ul-PrioritizationThres according to clause 5.4.5:
    2> prioritize the LCG(s) for the Destination(s).
  1> if the Buffer Status reporting procedure determines that at least one BSR has been triggered and not cancelled according to clause 5.4.5 and the UL grant cannot accommodate a SL-BSR MAC CE containing buffer status only for all prioritized LCGs having data available for transmission plus the subheader of the SL-BSR according to clause 5.4.3.1.3, in case the SL-BSR is considered as not prioritized:
    2> prioritize the SL-BSR for logical channel prioritization specified in clause 5.4.3.1;
    2> report Truncated SL-BSR containing buffer status for as many prioritized LCGs having data available for transmission as possible, taking the number of bits in the UL grant into consideration.
  1> else if the number of bits in the UL grant is expected to be equal to or larger than the size of a SL-BSR containing buffer status for all LCGs having data available for transmission plus the subheader of the SL-BSR according to clause 5.4.3.1.3:
    2> report SL-BSR containing buffer status for all LCGs having data available for transmission.
  1> else:
    2> report Truncated SL-BSR containing buffer status for as many LCGs having data available for transmission as possible, taking the number of bits in the UL grant into consideration.

For Padding BSR:
  1> if the number of padding bits remaining after a Padding BSR has been triggered is equal to or larger than the size of a SL-BSR containing buffer status for all LCGs having data available for transmission plus its subheader:
2> report SL-BSR containing buffer status for all LCGs having data available for transmission;
1> else:
2> report Truncated SL-BSR containing buffer status for as many LCGs having data available for transmission as possible, taking the number of bits in the UL grant into consideration.

For SL-BSR triggered by retxBSR-Timer expiry, the MAC entity considers that the logical channel that triggered the SL-BSR is the highest priority logical channel that has data available for transmission at the time the SL-BSR is triggered.

The MAC entity shall:
1> if the sidelink Buffer Status reporting procedure determines that at least one SL-BSR has been triggered and not cancelled:
2> if UL-SCH resources are available for a new transmission and the UL-SCH resources can accommodate the SL-BSR MAC CE plus its subheader as a result of logical channel prioritization according to clause 5.4.3.1:
3> instruct the Multiplexing and Assembly procedure in clause 5.4.3 to generate the SL-BSR MAC CE(s);
3> start or restart periodicBSR-Timer except when all the generated SL-BSRs are Truncated SL-BSRs;
3> start or restart retxBSR-Timer.
2> if a Regular SL-BSR has been triggered and logicalChannelSR-DelayTimer is not running:
3> if there is no UL-SCH resource available for a new transmission; or
3> if the set of Subcarrier Spacing index values in sl-allowedSCS-List, if configured for the logical channel that triggered the SL-BSR, does not include the Subcarrier Spacing index associated to the UL-SCH resources available for a new transmission; or
3> if sl-maxPUSCH-Duration, if configured for the logical channel that triggered the SL-BSR, is smaller than the PUSCH transmission duration associated to the UL-SCH resources available for a new transmission:
4> trigger a Scheduling Request.

NOTE 1: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

[ . . . ]

Figure 5:
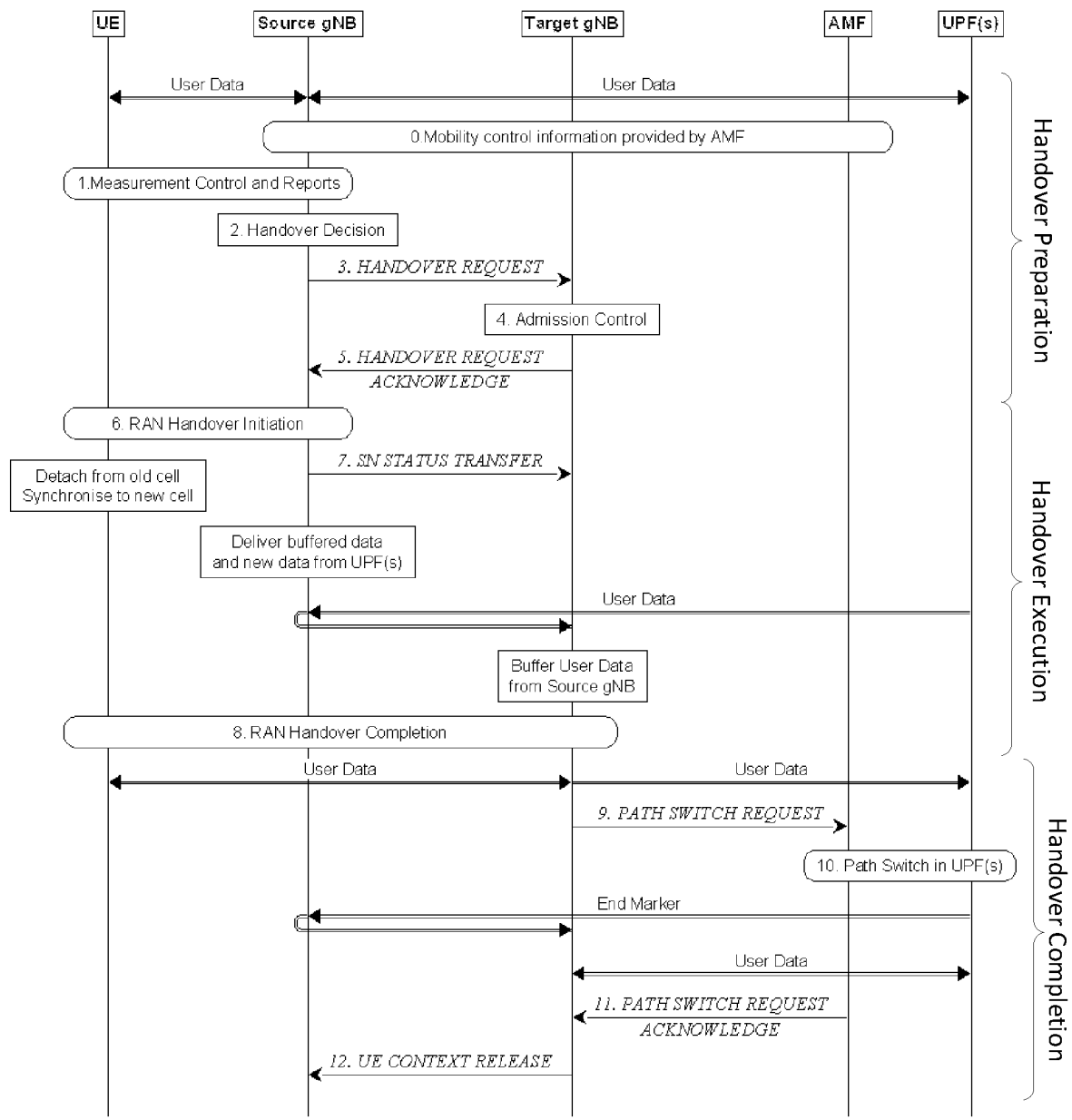
FIG. 5 is a diagram illustrating an exemplary scenario associated with intra-Access and Mobility Management Function (AMF)/User Plane Function (UPF) handover according to one exemplary embodiment.
Figure 6:
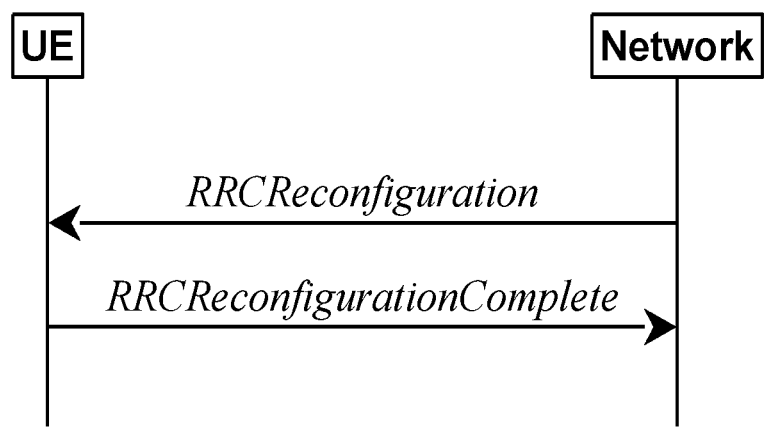
FIG. 6 is a diagram illustrating an exemplary scenario associated with successful Radio Resource Control (RRC) reconfiguration according to one exemplary embodiment.
Figure 7:
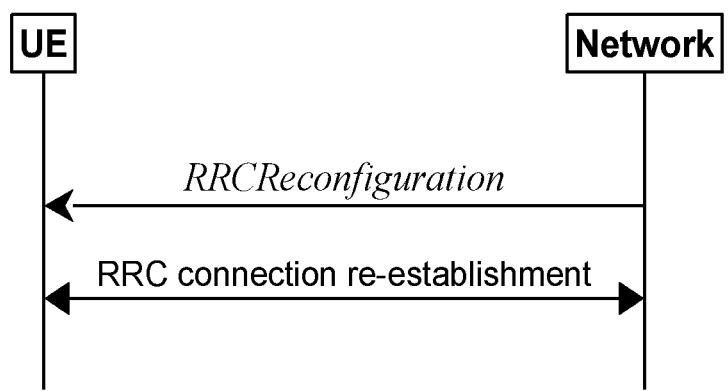
FIG. 7 is a diagram illustrating an exemplary scenario associated with RRC reconfiguration failure according to one exemplary embodiment.

RRC reconfiguration procedures involving handover (e.g., at least one of RRC reconfiguration, reconfiguration with sync, etc.) are introduced in 3GPP TS 38.331, V16.1.0. Notably, FIG. 5.3.5.1-1 of Section 5.3.5.1 of 3GPP TS 38.331, V16.1.0, entitled "RRC reconfiguration, successful", is reproduced herein as FIG. 6. FIG. 5.3.5.1-2 of Section 5.3.5.1 of 3GPP TS 38.331, V16.1.0, entitled "RRC reconfiguration, failure", is reproduced herein as FIG. 7. One or more parts of 3GPP TS 38.331, V16.1.0 are quoted below:

3.1 Definitions

Special Cell: For Dual Connectivity operation the term Special Cell refers to the PCell of the MCG or the PSCell of the SCG, otherwise the term Special Cell refers to the PCell.

5.3.5 RRC reconfiguration 5.3.5.1 General

FIG. 5.3.5.1-1: RRC Reconfiguration, Successful

FIG. 5.3.5.1-2: RRC Reconfiguration, Failure

The purpose of this procedure is to modify an RRC connection, e.g. to establish/modify/release RBs, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE.

RRC reconfiguration to perform reconfiguration with sync includes, but is not limited to, the following cases:
reconfiguration with sync and security key refresh, involving RA to the PCell/PSCell, MAC reset, refresh of security and re-establishment of RLC and PDCP triggered by explicit L2 indicators;
reconfiguration with sync but without security key refresh, involving RA to the PCell/PSCell, MAC reset and RLC re-establishment and PDCP data recovery (for AM DRB) triggered by explicit L2 indicators.
reconfiguration with sync for DAPS and security key refresh, involving RA to the target PCell, establishment of target MAC, and
for non-DAPS bearer: refresh of security and re-establishment of RLC and PDCP triggered by explicit L2 indicators;
for DAPS bearer: establishment of RLC for the target PCell, refresh of security and reconfiguration of PDCP to add the ciphering function and the integrity protection function of the target PCell;
for SRB: refresh of security and establishment of RLC and PDCP for the target PCell;
reconfiguration with sync for DAPS but without security key refresh, involving RA to the target PCell, establishment of target MAC, and:
for non-DAPS bearer: RLC re-establishment and PDCP data recovery (for AM DRB) triggered by explicit L2 indicators.
for DAPS bearer: establishment of RLC for target PCell, reconfiguration of PDCP to add the ciphering function and the integrity protection function of the target PCell;
for SRB: establishment of RLC and PDCP for the target PCell.

In (NG)EN-DC and NR-DC, SRB3 can be used for measurement configuration and reporting, for UE assistance (re-)configuration and reporting for power savings, to (re-)configure MAC, RLC, physical layer and RLF timers and constants of the SCG configuration, and to reconfigure PDCP for DRBs associated with the S-$K_{gNB}$ or SRB3, and to reconfigure SDAP for DRBs associated with S-$K_{gNB}$ in NGEN-DC and NR-DC, and to add/modify/release conditional PSCell change configuration, provided that the (re-)configuration does not require any MN involvement. In (NG)EN-DC and NR-DC, only measConfig, radioBearer- Config, conditionalReconfiguration, otherConfig and/or secondaryCellGroup are included in RRCReconfiguration received via SRB3.

5.3.5.2 Initiation

The Network may initiate the RRC reconfiguration procedure to a UE in RRC_CONNECTED. The Network applies the procedure as follows:

the establishment of RBs (other than SRB1, that is established during RRC connection establishment) is performed only when AS security has been activated;
  the addition of Secondary Cell Group and SCells is performed only when AS security has been activated;
  the reconfigurationWithSync is included in secondaryCellGroup only when at least one RLC bearer is setup in SCG;
  the reconfigurationWithSync is included in masterCellGroup only when AS security has been activated, and SRB2 with at least one DRB or, for IAB, SRB2, are setup and not suspended;
  the conditionalReconfiguration for CPC is included only when at least one RLC bearer is setup in SCG;
  the conditionalReconfiguration for CHO is included only when AS security has been activated, and SRB2 with at least one DRB or, for IAB, SRB2, are setup and not suspended.

5.3.5.3 Reception of an RRCReconfiguration by the UE

The UE shall perform the following actions upon reception of the RRCReconfiguration, or upon execution of the conditional reconfiguration (CHO or CPC):

1> if the RRCReconfiguration is applied due to a conditional reconfiguration execution upon cell selection while timer T311 is running, as defined in 5.3.7.3:
    2> remove all the entries within VarConditionalReconfig, if any;
  1> if the RRCReconfiguration includes the daps-SourceRelease:
    2> release source SpCell configuration;
    2> reset the source MAC and release the source MAC configuration;
    2> for each DAPS bearer:
      3> release the RLC entity or entities as specified in TS 38.322 [4], clause 5.1.3, and the associated logical channel for the source SpCell;
      3> reconfigure the PDCP entity to release DAPS as specified in TS 38.323 [5];
    2> for each SRB:
      3> release the PDCP entity for the source SpCell;
      3> release the RLC entity as specified in TS 38.322 [4], clause 5.1.3, and the associated logical channel for the source SpCell;
    2> release the physical channel configuration for the source SpCell;
    2> discard the keys used in the source SpCell (the $K_{gNB}$ key, the $K_{RRCenc}$ key, the $K_{RRCint}$ key, the $K_{UPint}$ key and the $K_{UPenc}$ key), if any;
  1> if the RRCReconfiguration is received via other RAT (i.e., inter-RAT handover to NR):
    2> if the RRCReconfiguration does not include the fullConfig and the UE is connected to 5GC (i.e., delta signalling during intra 5GC handover):
      3> re-use the source RAT SDAP and PDCP configurations if available (i.e., current SDAP/PDCP configurations for all RBs from source E-UTRA RAT prior to the reception of the inter-RAT HO RRCReconfiguration message);
  1> else:
    2> if the RRCReconfiguration includes the fullConfig:
      3> perform the full configuration procedure as specified in 5.3.5.11;
  1> if the RRCReconfiguration includes the masterCellGroup:
    2> perform the cell group configuration for the received masterCellGroup according to 5.3.5.5;
    [ . . . ]2> submit the RRCReconfigurationComplete message via SRB1 to lower layers for transmission using the new configuration;
    . . .
  1> if reconfigurationWithSync was included in spCellConfig of an MCG or SCG, and when MAC of an NR cell group successfully completes a Random Access procedure triggered above:
    2> stop timer T304 for that cell group;
    2> stop timer T310 for source SpCell if running;
    2> apply the parts of the CSI reporting configuration, the scheduling request configuration and the sounding RS configuration that do not require the UE to know the SFN of the respective target SpCell, if any;
    2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
    2> for each DRB configured as DAPS bearer, request uplink data switching to the PDCP entity, as specified in TS 38.323 [5];
    2> if the reconfigurationWithSync was included in spCellConfig of an MCG:
      3> if T390 is running:
        4> stop timer T390 for all access categories;
        4> perform the actions as specified in 5.3.14.4.
      3> if T350 is running:
        4> stop timer T350;
      3> if RRCReconfiguration does not include dedicatedSIB1-Delivery and
      3> if the active downlink BWP, which is indicated by the firstActiveDownlinkBWP-Id for the target SpCell of the MCG, has a common search space configured by searchSpaceSIB1:
        4> acquire the SIB1, which is scheduled as specified in TS 38.213 [13], of the target SpCell of the MCG;
        4> upon acquiring SIB1, perform the actions specified in clause 5.2.2.4.2;
    2> if the reconfigurationWithSync was included in spCellConfig of an MCG; or:
    2> if the reconfigurationWithSync was included in spCellConfig of an SCG and the CPC was configured
      3> remove all the entries within VarConditionalReconfig, if any;
      3> for each measId of the source SpCell configuration, if the associated reportConfig has a reportType set to condTriggerConfig:
        4> for the associated reportConfigId:
          5> remove the entry with the matching reportConfigId from the reportConfigList within the VarMeasConfig;
        4> if the associated measObjectId is only associated to a reportConfig with reportType set to cho-TriggerConfig:
          5> remove the entry with the matching measObjectId from the measObjectList within the VarMeasConfig;

4> remove the entry with the matching measId from the measIdList within the VarMeasConfig;
2> if reconfigurationWithSync was included in master-CellGroup or secondaryCellGroup; and
2> if the UE transmitted a UEAssistanceInformation message for the corresponding cell group during the last 1 second, and the UE is still configured to provide UE assistance information for the corresponding cell group:
3> initiate transmission of a UEAssistanceInformation message for the corresponding cell group in accordance with clause 5.7.4.3;
2> if SIB12 is provided by the target PCell; and the UE transmitted a SidelinkUEInformationNR message indicating a change of NR sidelink communication related parameters relevant in target PCell (i.e. change of sl-RxInterestedFreqList or sl-TxResourceReqList) during the last 1 second preceding reception of the RRCReconfiguration message including reconfigurationWithSync in spCellConfig of an MCG:
3> initiate transmission of the SidelinkUEInformationNR message in accordance with 5.8.3.3;
2> the procedure ends.
NOTE 3: The UE is only required to acquire broadcasted SIB1 if the UE can acquire it without disrupting unicast data reception, i.e. the broadcast and unicast beams are quasi co-located.

5.3.5.5 Cell Group Configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:
1> if the CellGroupConfig contains the spCellConfig with reconfigurationWithSync:
2> perform Reconfiguration with sync according to 5.3.5.5.2;
2> resume all suspended radio bearers and resume SCG transmission for all radio bearers, if suspended;
[ . . . ]1> if the CellGroupConfig contains the spCellConfig:
2> configure the SpCell as specified in 5.3.5.5.7;

5.3.5.5.2 Reconfiguration with Sync

The UE shall perform the following actions to execute a reconfiguration with sync.
1> if the AS security is not activated, perform the actions upon going to RRC_IDLE as specified in 5.3.11 with the release cause 'other' upon which the procedure ends;
1> if no DAPS bearer is configured:
2> stop timer T310 for the corresponding SpCell, if running;
1> if this procedure is executed for the MCG:
2> if timer T316 is running;
3> stop timer T316;
3> clear the information included in VarRLF-Report, if any;
2> resume MCG transmission, if suspended.
1> stop timer T312 for the corresponding SpCell, if running;
1> start timer T304 for the corresponding SpCell with the timer value set to t304, as included in the reconfigurationWithSync;
1> if the frequencyInfoDL is included:
2> consider the target SpCell to be one on the SSB frequency indicated by the frequencyInfoDL with a physical cell identity indicated by the physCellId;
1> else:
2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1 for the target SpCell;
1> acquire the MIB of the target SpCell, which is scheduled as specified in TS 38.213 [13];
NOTE 1: The UE should perform the reconfiguration with sync as soon as possible following the reception of the RRC message triggering the reconfiguration with sync, which could be before confirming successful reception (HARQ and ARQ) of this message.
NOTE 2: The UE may omit reading the MIB if the UE already has the required timing information, or the timing information is not needed for random access.
NOTE 2a: A UE with DAPS bearer does not monitor for system information updates in the source PCell.
1> If any DAPS bearer is configured:
2> create a MAC entity for the target cell group with the same configuration as the MAC entity for the source cell group;
2> for each DAPS bearer:
3> establish an RLC entity or entities for the target cell group, with the same configurations as for the source cell group;
3> establish the logical channel for the target cell group, with the same configurations as for the source cell group;
2> for each SRB:
3> establish an RLC entity for the target cell group, with the same configurations as for the source cell group;
3> establish the logical channel for the target cell group, with the same configurations as for the source cell group;
3> suspend SRBs for the source cell group;
NOTE 3: Void
2> apply the value of the newUE-Identity as the C-RNTI in the target cell group;
2> configure lower layers for the target SpCell in accordance with the received spCellConfigCommon;
2> configure lower layers for the target SpCell in accordance with any additional fields, not covered in the previous, if included in the received reconfigurationWithSync.
1> else:
2> reset the MAC entity of this cell group;
2> consider the SCell(s) of this cell group, if configured, that are not included in the SCellsToAddModList in the RRCReconfiguration message, to be in deactivated state;
2> apply the value of the newUE-Identity as the C-RNTI for this cell group;
2> configure lower layers in accordance with the received spCellConfigCommon;
2> configure lower layers in accordance with any additional fields, not covered in the previous, if included in the received reconfigurationWithSync.

5.3.5.5.7 SpCell Configuration

The UE shall:

1> if the SpCellConfig contains the rlf-TimersAndConstants:
  2> configure the RLF timers and constants for this cell group as specified in 5.3.5.5.6;
1> else if rlf-TimersAndConstants is not configured for this cell group:
  2> if any DAPS bearer is configured:
    3> use values for timers T301, T310, T311 and constants N310, N311 for the target cell group, as included in ue-TimersAndConstants received in SIB1;
  2> else
    3> use values for timers T301, T310, T311 and constants N310, N311, as included in ue-TimersAndConstants received in SIB1;
1> if the SpCellConfig contains spCellConfigDedicated:
  2> configure the SpCell in accordance with the spCellConfigDedicated;
  2> consider the bandwidth part indicated in firstActiveUplinkBWP-Id if configured to be the active uplink bandwidth part;
  2> consider the bandwidth part indicated in firstActiveDownlinkBWP-Id if configured to be the active downlink bandwidth part;
  2> if any of the reference signal(s) that are used for radio link monitoring are reconfigured by the received spCellConfigDedicated:
    3> stop timer T310 for the corresponding SpCell, if running;
    3> stop timer T312 for the corresponding SpCell, if running;
    3> reset the counters N310 and N311.

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

| CellGroupConfig information element |
| --- |
| -- Configuration of one Cell-Group:<br>CellGroupConfig ::=  SEQUENCE {<br>  cellGroupId  CellGroupId,<br>  rlc-BearerToAddModList  SEQUENCE (SIZE(1..maxLC-ID)) OF RLC-BearerConfig  OPTIONAL, -- Need N<br>  rlc-BearerToReleaseList  SEQUENCE (SIZE(1..maxLC-ID) ) OF LogicalChannelIdentity  OPTIONAL, -- Need N<br>  mac-CellGroupConfig  MAC-CellGroupConfig  OPTIONAL, -- Need M<br>  physicalCellGroupConfig  PhysicalCellGroupConfig  OPTIONAL, -- Need M<br>  spCellConfig  SpCellConfig  OPTIONAL, -- Need M<br>  sCellToAddModList  SEQUENCE (SIZE (1..maxNrofSCells)) OF SCellConfig  OPTIONAL, -- Need N<br>  sCellToReleaseList  SEQUENCE (SIZE (1..maxNrofSCells) ) OF SCellIndex  OPTIONAL, -- Need N<br>  ...,<br>  [[<br>  reportUplinkTxDirectCurrent  ENUMERATED {true}  OPTIONAL -- Cond BWP-Reconfig<br>  ]],<br>  [...]<br>} |

| CellGroupConfig information element |
| --- |
| [...]<br>-- Serving cell specific MAC and PHY parameters for a SpCell:<br>SpCellConfig ::=  SEQUENCE {<br>  servCellIndex  ServCellIndex  OPTIONAL, -- Cond SCG<br>  reconfigurationWithSync  ReconfigurationWithSync  OPTIONAL,- - Cond ReconfWithSync<br>  rlf-TimersAndConstants  SetupRelease { RLF-TimersAndConstants }  OPTIONAL, -- Need M<br>  rlmInSyncOutOfSyncThreshold  ENUMERATED {n1}  OPTIONAL, -- Need S<br>  spCellConfigDedicated  ServingCellConfig  OPTIONAL, -- Need M<br>}<br>ReconfigurationWithSync ::=  SEQUENCE {<br>  spCellConfigCommon  ServingCellConfigCommon  OPTIONAL, -- Need M<br>  newUE-Identity  RNTI-Value,<br>  t304  ENUMERATED {ms50, ms100, ms150, ms200, ms500, ms1000, ms2000, ms10000},<br>  rach-ConfigDedicated  CHOICE {<br>    uplink  RACH-ConfigDedicated,<br>    supplementaryUplink  RACH-ConfigDedicated<br>  }  OPTIONAL, -- Need N<br>  ...,<br>  [[<br>  smtc  SSB-MTC  OPTIONAL -- Need S<br>  ]]<br>}<br>[...] |

| CellGroupConfig field descriptions |
| --- |
| mac-CellGroupConfig |
| MAC parameters applicable for the entire cell group. |
| rlc-BearerToAddModList |
| Configuration of the MAC Logical Channel, the corresponding RLC entities and association with radio bearers. |
| reportUplinkTxDirectCurrent |
| Enables reporting of uplink and supplementary uplink Direct Current location information upon BWP configuration and reconfiguration. This field is only present when the BWP configuration is modified or any serving cell is added or removed. This field is absent in the IE CellGroupConfig when provided as part of RRCSetup message. If UE is configured with SUL carrier, UE reports both UL and SUL Direct Current locations. |
| rlmInSyncOutOfSyncThreshold |
| BLER threshold pair index for IS/OOS indication generation, see TS 38.133 [14], table 8.1.1-1. n1 corresponds to the value 1. When the field is absent, the UE applies the value 0. Whenever this is reconfigured, UE resets N310 and N311, and stops T310, if running. Network does not include this field. |
| sCellToAddModList |
| List of secondary serving cells (SCells) to be added or modified. |
| sCellToReleaseList |
| List of secondary serving cells (SCells) to be released. |
| spCellConfig |
| Parameters for the SpCell of this cell group (PCell of MCG or PSCell of SCG). |

ServingCellConfigCommon

The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

| ServingCellConfigCommon information element |
| --- |
| -- ASN1START |
| -- TAG-SERVINGCELLCONFIGCOMMON-START |
| ServingCellConfigCommon ::=         SEQUENCE { |
|     physCellId                      PhysCellId |
| OPTIONAL,   -- Cond HOAndServCellAdd, |
|     downlinkConfigCommon            DownlinkConfigCommon |
| OPTIONAL,   -- Cond HOAndServCellAdd |
|     uplinkConfigCommon              UplinkConfigCommon |
| OPTIONAL,   -- Need M |
|     supplementaryUplinkConfig       UplinkConfigCommon |
| OPTIONAL,   -- Need S |
|     n-TimingAdvanceOffset           ENUMERATED { n0, |
| n25600, n39936 }                    OPTIONAL,-- Need S |
|     [...] tdd-UL-DL-ConfigurationCommon    TDD-UL-DL- |
| ConfigCommon OPTIONAL, -- Cond TDD |
| [...] |

| ServingCellConfigCommon field descriptions |
| --- |
| downlinkConfigCommon |
| The common downlink configuration of the serving cell, including the frequency information configuration and the initial downlink BWP common configuration. The parameters provided herein should match the parameters configured by MIB and SIB1 (if provided) of the serving cell, with the exception of controlResourceSetZero and searchSpaceZero which can be configured in ServingCellConfigCommon even if MIB indicates that they are absent. |
| supplementaryUplinkConfig |
| The network configures this field only if uplinkConfigCommon is configured. If this field is absent, the UE shall release the supplementaryUplinkConfig and the supplementaryUplink configured in ServingCellConfig of this serving cell, if configured. |
| tdd-UL-DL-ConfigurationCommon |
| A cell-specific TDD UL/DL configuration, see TS 38.213 [13], clause 11.1. |

| Conditional Presence | Explanation |
| --- | --- |
| AbsFreqSSB | The field is absent when absoluteFrequencySSB in frequencyInfoDL is absent, otherwise the field is mandatory present. |
| HOAndServCellAdd | This field is mandatory present upon SpCell change and upon serving cell (PSCell/SCell) addition. Otherwise, the field is absent. |
| HOAndServCellWithSSB | This field is mandatory present upon SpCell change and upon serving cell (SCell with SSB or PSCell) addition. Otherwise, the field is absent. |
| TDD | The field is optionally present, Need R, for TDD cells; otherwise it is absent. |

MAC-CellGroupConfig

The IE MAC-CellGroupConfig is used to configure MAC parameters for a cell group, including DRX.

| MAC-CellGroupConfig information element |
| --- |
| -- ASN1START |
| -- TAG-MAC-CELLGROUPCONFIG-START |

| MAC-CellGroupConfig information element |
| --- |
| MAC-CellGroupConfig ::=         SEQUENCE { |
|     drx-Config                  SetupRelease { DRX-Config } |
| OPTIONAL,   -- Need M |
|     schedulingRequestConfig     SchedulingRequestConfig |
| OPTIONAL,   -- Need M |
|     bsr-Config                  BSR-Config |
| OPTIONAL,   -- Need M |
|     tag-Config                  TAG-Config |
| OPTIONAL,   -- Need M |
|     phr-Config                  SetupRelease { PHR-Config } |
| OPTIONAL,   -- Need M |
|     skipUplinkTxDynamic         BOOLEAN, |
|     ..., |
|     [[ |
|     csi-Mask                    BOOLEAN |
| OPTIONAL,   -- Need M |
|     dataInactivityTimer         SetupRelease { |
| DataInactivityTimer }               OPTIONAL   -- Cond |
| MCG-Only |
|     ]] , |
|     [[ |
|     usePreBSR-rl6               ENUMERATED {true} |
| OPTIONAL,   -- Need M |
|     lbt-FailureRecoveryConfig-r16   LBT-FailureRecoveryConfig-r16 |
| OPTIONAL,   -- Need M |
|     schedulingRequestID-LBT-SCell-r16   SchedulingRequestId |
| OPTIONAL,   -- Need M |
|     lch-BasedPrioritization-r16 ENUMERATED {enabled} |
| OPTIONAL,   -- Need R |
|     schedulingRequestID-BFR-SCell-r16   SchedulingRequestId |
| OPTIONAL   -- Need R |
|     ]] |
| } |
| DataInactivityTimer ::=         ENUMERATED {s1, s2, s3, s5, s7, s10, s15, s20, s40, s50, s60, s80, s100, s120, s150, s180) |
| -- TAG-MAC-CELLGROUPCONFIG-STOP |
| -- ASN1STOP |

| MAC-CellGroupConfig field descriptions |
| --- |
| usePreBSR |
| If set to true, the MAC entity of the IAB-MT will activate the pre-BSR. |
| csi-Mask |
| If set to true, the UE limits CSI reports to the on-duration period of the DRX cycle, see TS 38.321 [3]. |
| dataInactivityTimer |
| Releases the RRC connection upon data inactivity as specified in clause 5.3.8.5 and in TS 38.321 [3]. Value s1 corresponds to 1 second, value s2 corresponds to 2 seconds, and so on. |
| drx-Config |
| Used to configure DRX as specified in TS 38.321 [3]. |
| lch-BasedPrioritization |
| If this field is present, the UE is configured with prioritization between overlapping grants and between scheduling request and overlapping grants based on LCH priority, see see TS 38.321 [3]. |
| Editor's Note: It is FFS whether SR/data prioritization can be a separate configurable parameter from data/data prioritization. |
| schedulingRequestID-BFR-SCell |
| If present, it indicates the scheduling request configuration applicable for BFR on SCell, as specified in TS 38.321 [3]. |
| schedulingReciuestID-LBT-SCell |
| Indicates the scheduling request configuration applicable for consistent uplink LBT recovery on SCell, as specified in TS 38.321 [3]. |

| | |
|---|---|
| skipUplinkTxDynamic | |
| If set to true, the UE skips UL transmissions as described in TS 38.321 [3]. | |
| Conditional Presence | Explanation |
| MCG-Only | This field is optionally present, Need M, for the MAC-CellGroupConfig of the MCG. It is absent otherwise. |

In NR, a UE may perform a handover (HO) procedure to switch from one cell to another cell. The UE may perform the handover procedure in response to a Radio Resource Control (RRC) signaling transmitted by a network. The RRC signaling may comprise cell information of a target cell. The network determines to initiate the handover procedure based on one or more measurement reports of the UE. Switching between cells may take place more frequently when a UE is operating and/or performing communication in a frequency range, such as FR2 (e.g., 24.25 GHz to 52.6 GHz). Based on work item description (WID) of further enhancements of MIMO in RP-193133 New WID, inter-cell mobility considering Layer-1 and/or Layer-2 solution may reduce latency of the handover procedures. The term "signaling" as used herein may correspond to at least one of a signal, a set of signals, a transmission, a message, etc.

A mobility procedure (e.g., a Layer-1 and/or Layer-2 mobility procedure (L1/L2 mobility procedure)) may comprise a source cell (e.g., an original Primary Cell (PCell)) providing first information to a UE, wherein the first information indicates and/or provides a configuration associated with a target cell. The configuration may comprise cell addition information and/or beam information associated with the target cell. Alternatively and/or additionally, the configuration may comprise a downlink (DL) configuration and/or an uplink (UL) configuration of the target cell. The source cell may provide second information to the UE, wherein the second information indicates initiation of a mobility procedure to access the target cell (e.g., a new PCell). The mobility procedure may comprise a random access procedure (e.g., a random access procedure on the target cell), one or more Physical Uplink Shared Channel (PUSCH) transmissions and/or beam activation (e.g., beam Transmission Configuration Indicator (TCI) state activation). In some examples, the second information may not comprise a RRC signaling and/or a RRC message (and/or the second information may not be provided to the UE via a RRC signaling and/or a RRC message). The second information may comprise a Layer-1 (L1) message (e.g., a Downlink control information message, such as a L1 Downlink control information message) or a Layer-2 (L2) message (e.g., a Medium Access Control (MAC) Control Element (CE) message, such as a L2 MAC CE message). The second information may indicate an identity and/or an index associated with the target cell. The first information and the second information may be transmitted via different signaling and/or at different timings (e.g., the first information may be transmitted via a first signaling and/or at a first timing and/or the second information may be transmitted via a second signaling and/or at a second timing, wherein the first signaling is different than the second signaling and/or the first timing is different than the second timing). In some examples, the UE does not initiate the mobility procedure to the target cell in response to the first information (e.g., the UE may not initiate the mobility procedure to the target cell in response to reception of the first information). The UE may transmit a mobility completion message to the target cell, wherein the mobility completion message indicates completion of the procedure. Alternatively and/or additionally, the target cell may transmit an acknowledgment to the UE, wherein the acknowledgment indicates completion of the mobility procedure.

Figure 8:
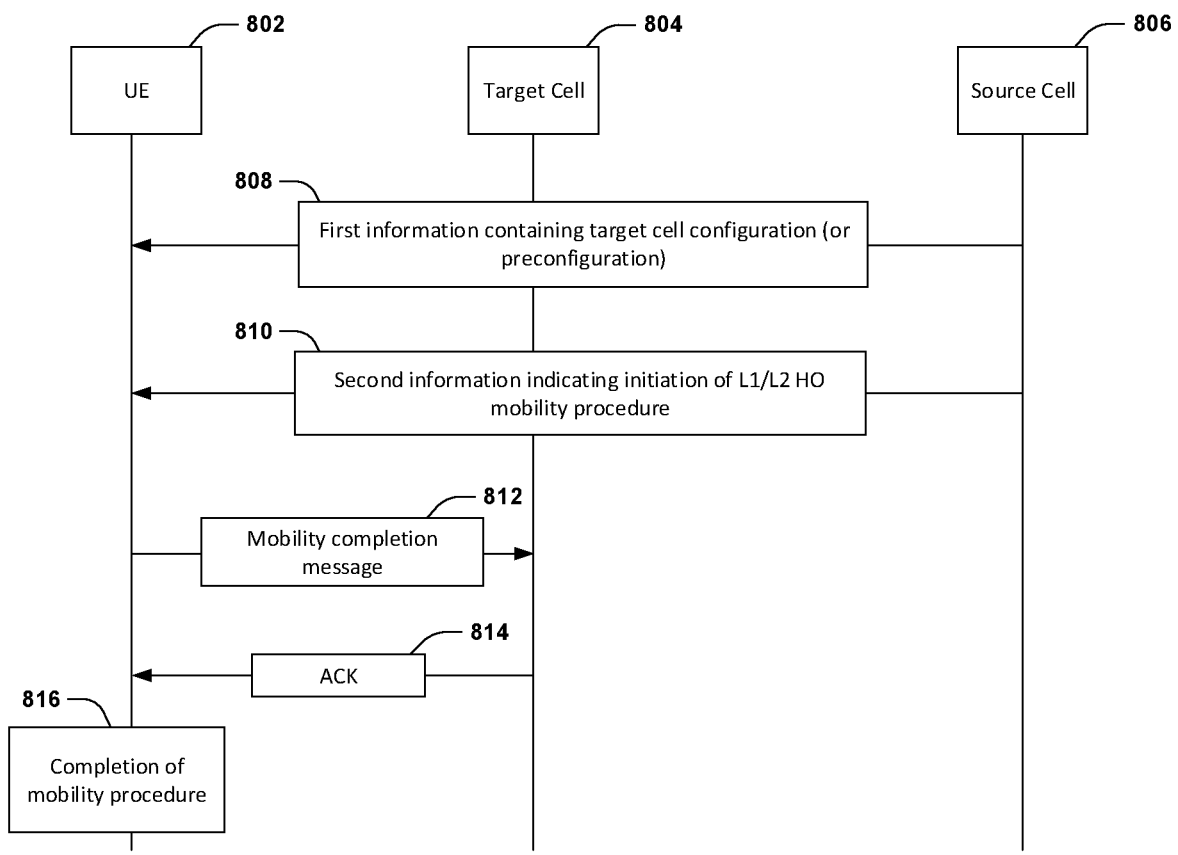
FIG. 8 is a diagram illustrating an exemplary scenario associated with a UE performing a mobility procedure according to one exemplary embodiment.

An example is shown in FIG. 8. At 808, the Source Cell (shown with reference number 806) may transmit the first information (comprising a target cell configuration and/or a target cell pre-configuration, for example) to the UE (shown with reference number 802). At 810, the Source Cell 806 may transmit the second information (indicating initiation of the mobility procedure (e.g., L1/L2 handover mobility procedure), for example) to the UE 802. At 812, the UE 802 may transmit the mobility completion message to the Target Cell (shown with reference number 804). At 814, the Target Cell 804 may transmit the acknowledgment to the UE 802 (e.g., the acknowledgment may indicate that the mobility completion message is successfully received by the Target Cell 804). At 816, the UE 802 may consider the mobility procedure to be complete. In some examples, the UE 802 may consider the mobility procedure to be complete in response to the acknowledgment from the Target Cell 804. Alternatively and/or additionally, the UE 802 may consider the mobility procedure to be complete in response to the transmission of the mobility completion message. Alternatively and/or additionally, the UE 802 may consider the mobility procedure to be complete in response to completion of a random access procedure (e.g., a random access procedure associated with the mobility procedure, such as a random access procedure performed on the Target Cell 804 during the mobility procedure). Alternatively and/or additionally, the UE 802 may maintain a timer (e.g., the timer may be provided and/or configured by the Source Cell 806). The timer may be started (and/or restarted) in response to the transmission of the mobility completion message. In an example in which the mobility completion message is transmitted via multiple transmissions, the timer may be started and/or restarted in response to an initial transmission of the multiple transmissions of the mobility completion message. The UE 802 may consider the mobility procedure to be failed in response to expiration of the timer (e.g., timer expiry). For example, the mobility procedure may be considered to be a failed mobility procedure if (and/or when) the timer expires. Alternatively and/or additionally, the timer may be stopped in response to completion of the mobility procedure. In some examples, in response to expiration of the timer, the UE 802 may at least one of stop an ongoing mobility procedure, stop monitoring the Target Cell 804 and/or stop transmitting a mobility completion message. The timer may be different than a T304 timer (e.g., the timer may be different than a timer from failure handling for handover procedure).

In the present disclosure, techniques, systems and/or procedures regarding triggering and/or completion of Layer-1 (L1) and/or Layer-2 (L2) mobility procedures are provided.

A first concept of the present disclosure is that a UE may perform a first set of actions (e.g., a set of one or more actions) for a first MAC entity of the UE in response to a mobility procedure (e.g., in response to initiation and/or completion of the mobility procedure). The first set of actions may comprise one or more actions of a plurality of actions discussed below (e.g., the first set of actions may be a part of the plurality of actions). The UE may not perform a second set of actions (e.g., a set of one or more actions) for the first MAC entity of the UE in response to the mobility procedure (e.g., in response to initiation and/or completion of the mobility procedure). The second set of actions may comprise one or more actions of the plurality of actions (e.g., the second set of actions may be a part of the plurality of actions). In some examples, the UE may not perform the first set of actions for a second MAC entity of the UE in response to the mobility procedure (e.g., in response to initiation and/or completion of the mobility procedure). In some examples, the UE may not perform the second set of actions for the second MAC entity of the UE in response to the mobility procedure (e.g., in response to initiation and/or completion of the mobility procedure). The first MAC entity may be associated with a source cell of the mobility procedure. Alternatively and/or additionally, the first MAC entity may be associated with a target cell of the mobility procedure. Alternatively and/or additionally, the second MAC entity may not be associated with the source cell of the mobility procedure.

For example, in response to initiation of a mobility procedure, the UE may determine whether or not to perform one or more actions (e.g., one or more actions and/or a combination of actions of the plurality of actions) for the first MAC entity (associated with the source cell, for example) based on a type of the target cell.

Alternatively and/or additionally, in response to completion of the mobility procedure (from a network, for example), the UE may determine whether or not to perform one or more actions (e.g., an action and/or a combination of actions of the plurality of actions) for the first MAC entity (associated with the source cell, for example) based on the type of the target cell.

The type of the target cell may be a Secondary Cell (SCell) or a non-serving cell (e.g., neighboring cell) of the UE. The SCell may be associated with a master cell group or a secondary cell group of the UE. The target cell may not be associated with a cell group different than a cell group of the source cell (e.g., the target cell and the source cell may be in the same cell group).

In some examples, the UE may perform the first set of actions if the target cell is a non-serving cell. In some examples, the UE may not perform the second set of actions if the target cell is a non-serving cell. Alternatively and/or additionally, the UE may not perform a third set of actions (e.g., a set of one or more actions) if the target cell is a SCell. The third set of actions may comprise one or more actions of the plurality of actions (e.g., the third set of actions may be a part of the plurality of actions). In some examples, the UE may perform a fourth set of actions (e.g., a set of one or more actions) if the target cell is a SCell. The fourth set of actions may comprise one or more actions of the plurality of actions (e.g., the fourth set of actions may be a part of the plurality of actions).

In some examples, one, some and/or all actions of the first set of actions are the same as one, some and/or all actions of the third set of actions. In some examples, one, some and/or all actions of the second set of actions are the same as one, some and/or all actions of the fourth set of actions.

Alternatively and/or additionally, the UE may determine whether or not to perform one or more actions (e.g., an action and/or a combination of actions of the plurality of actions) for the first MAC entity (associated with the source cell, for example) in response to the mobility procedure (e.g., in response to initiation and/or completion of the mobility procedure) based on the mobility procedure, such as based on one or more types of the mobility procedure (and/or based on other information in addition to the mobility procedure and/or the one or more types of the mobility procedure).

Alternatively and/or additionally, the UE may determine whether or not to perform one or more actions (e.g., an action and/or a combination of actions of the plurality of actions) for the first MAC entity (associated with the source cell, for example) based on second information, associated with the mobility procedure, from a network. For example, the UE may receive the second information from the network.

The second information may indicate to (e.g., instruct) the UE to perform a random access procedure to the target cell. Alternatively and/or additionally, the second information may indicate to (e.g., instruct) the UE to perform an uplink transmission to the target cell (via one or more uplink resources provided and/or configured by the source cell, for example). Alternatively and/or additionally, the second information may indicate to (e.g., instruct) the UE to receive a signaling (e.g., a signaling indicating completion of the mobility procedure) from the target cell (e.g., receive the signaling from the target cell via a beam and/or one or more TCI states indicated and/or configured by the source cell).

The mobility procedure may comprise the UE performing a random access procedure to the target cell. Alternatively, in some examples, the mobility procedure may not comprise the UE performing a random access procedure to the target cell. Alternatively and/or additionally, the mobility procedure may comprise the UE performing an uplink transmission to the target cell (via one or more uplink resources provided and/or configured by the source cell, for example). Alternatively and/or additionally, the mobility procedure may comprise the UE receiving a signaling (e.g., a signaling indicating completion of the mobility procedure) from the target cell (e.g., receiving the signaling from the target cell via a beam and/or one or more TCI states indicated and/or configured by the source cell).

In some examples, the UE may not perform a fifth set of actions (e.g., a set of one or more actions) if the mobility procedure comprises performing a random access procedure. The fifth set of actions may comprise one or more actions of the plurality of actions (e.g., the fifth set of actions may be a part of the plurality of actions). Alternatively and/or additionally, the UE may perform a sixth set of actions (e.g., a set of one or more actions) if the mobility procedure does not comprise performing a random access procedure. The sixth set of actions may comprise one or more actions of the plurality of actions (e.g., the sixth set of actions may be a part of the plurality of actions). In another example, the UE may not perform a seventh set of actions (e.g., a set of one or more actions) if the mobility procedure does not comprise performing an uplink transmission (to the target cell, for example) via one or more configured (e.g., pre-configured) uplink resources provided by the source cell. The seventh set of actions may comprise one or more actions of the plurality of actions (e.g., the seventh set of actions may be a part of the plurality of actions). Alternatively and/or additionally, the UE may perform an eighth set of actions (e.g., a set of one or more actions) if the mobility procedure comprises performing an uplink transmission (to the target cell, for example) via one or more configured (e.g., pre-configured) uplink resources provided by the source cell. The eighth set of actions may comprise one or more actions of the plurality of actions (e.g., the eighth set of actions may be a part of the plurality of actions).

In some examples, an action of the plurality of actions may comprise resetting a MAC entity (and/or performing a MAC Reset). For example, the UE may reset a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not reset the MAC entity in response to the mobility procedure (e.g., in response to initiation and/or completion of the mobility procedure) and/or in response to reception of the second information. For example, the UE may reset the MAC entity (in response to initiation or completion of the mobility procedure or in response to reception of the second information, for example) if the target cell is a non-serving cell. Alternatively and/or additionally, the UE may not reset the MAC entity (in response to initiation and/or completion of the mobility procedure and/or in response to reception of the second information, for example) if the target cell is a SCell of a Cell group associated with the source cell (e.g., the source cell may be part of the Cell group). Alternatively and/or additionally, the UE may reset the MAC entity (in response to initiation or completion of the mobility procedure or in response to reception of the second information, for example) if the target cell is a SCell of a Cell group that is not associated with the source cell (e.g., a secondary Cell group). In another example, the UE may reset the MAC entity (in response to initiation or completion of the mobility procedure or in response to reception of the second information, for example) if the mobility procedure comprises performing a random access procedure. Alternatively and/or additionally, the UE may not reset the MAC entity (in response to initiation and/or completion of the mobility procedure and/or in response to reception of the second information, for example) if the mobility procedure does not comprise performing a random access procedure. Alternatively and/or additionally, the UE may not reset the MAC entity (in response to initiation and/or completion of the mobility procedure and/or in response to reception of the second information, for example) if the mobility procedure comprises the UE performing (e.g., transmitting) an uplink transmission to the target cell via an uplink grant provided and/or configured (e.g., pre-configured) by the source cell.

In some examples, an action of the plurality of actions may comprise stopping one, some and/or all timers of a MAC entity. For example, the UE may stop one or more first timers of a MAC entity (e.g., a MAC entity for and/or of the source cell or a MAC entity for and/or of the target cell) in response to the mobility procedure (e.g., in response to initiation or completion of the mobility procedure) or in response to reception of the second information. The one or more first timers may comprise one, some and/or all timers of the MAC entity. Alternatively, in some examples, the UE may not stop one, some and/or all timers of the MAC entity (e.g., the one or more first timers of the MAC entity) in response to the mobility procedure (e.g., in response to initiation and/or completion of the mobility procedure) and/or in response to reception of the second information. For example, the UE may stop the one or more first timers (in response to initiation or completion of the mobility procedure or in response to reception of the second information, for example) if the target cell is a non-serving cell. The UE may not stop the one or more first timers (in response to initiation and/or completion of the mobility procedure and/or in response to reception of the second information, for example) if the target cell is a SCell. In another example, the UE may stop the one or more first timers (in response to initiation or completion of the mobility procedure or in response to reception of the second information, for example) if the mobility procedure comprises performing a random access procedure on the target cell. The UE may not stop the one or more first timers (in response to initiation or completion of the mobility procedure and/or in response to reception of the second information, for example) if the mobility procedure comprises the UE performing (e.g., transmitting) an uplink transmission to the target cell via an uplink grant provided and/or configured (e.g., pre-configured) by the source cell.

In some examples, an action of the plurality of actions may comprise considering one, some and/or all timers, of a MAC entity, associated with timing alignment to be expired. For example, the UE may consider one or more second timers, of a MAC entity (e.g., a MAC entity for and/or of the source cell or a MAC entity for and/or of the target cell), associated with timing alignment to be expired in response to the mobility procedure (e.g., in response to initiation or completion of the mobility procedure) or in response to reception of the second information. The one or more second timers may comprise one, some and/or all timers, of the MAC entity, that are associated with timing alignment. Alternatively, in some examples, the UE may not consider one, some and/or all timers, of the MAC entity, associated with timing alignment (e.g., the one or more second timers associated with timing alignment) to be expired in response to the mobility procedure (e.g., in response to initiation and/or completion of the mobility procedure) and/or in response to reception of the second information. In some examples, a timer of the one or more second timers (and/or each timer of the one or more second timers) may be a timeAligmentTimer. For example, the UE may consider the one or more second timers to be expired (in response to initiation or completion of the mobility procedure or in response to reception of the second information, for example) if the target cell is a non-serving cell. The UE may not consider the one or more second timers to be expired (in response to initiation and/or completion of the mobility procedure and/or in response to reception of the second information, for example) if the target cell is a SCell. In another example, the UE may consider the one or more second timers to be expired (in response to initiation or completion of the mobility procedure or in response to reception of the second information, for example) if the mobility procedure comprises a random access procedure. The UE may not consider the one or more second timers to be expired (in response to initiation and/or completion of the mobility procedure and/or in response to reception of the second information, for example) if the mobility procedure comprises the UE performing an uplink transmission to the target cell via an uplink grant provided and/or configured (e.g., pre-configured) by the source cell (e.g., the uplink grant may be provided and/or configured via the first information and/or the second information). The UE may not consider the one or more second timers to be expired if the mobility procedure comprises receiving a timing alignment (TA) value associated with the target cell (via the first information and/or the second information, for example).

In some examples, an action of the plurality of actions may comprise stopping one or more random access procedures (e.g., one or more ongoing random access procedures) of a MAC entity. For example, the UE may stop one or more random access procedure (e.g., one or more ongoing random access procedures) of a MAC entity (e.g., a MAC entity for and/or of the source cell or a MAC entity for and/or of the target cell) in response to the mobility procedure (e.g., in response to initiation or completion of the mobility procedure) or in response to reception of the second information.

Alternatively, in some examples, the UE may not stop the one or more random access procedures (and/or one or more second random access procedures, such as one or more second ongoing random access procedures) of the MAC entity in response to the mobility procedure (e.g., in response to initiation and/or completion of the mobility procedure) and/or in response to reception of the second information. For example, the UE may stop a random access procedure (e.g., an ongoing random access procedure) on the source cell in response to initiation of the mobility procedure if the target cell is a non-serving cell. Alternatively and/or additionally, the UE may not stop the random access procedure on the source cell (in response to initiation and/or completion of the mobility procedure and/or in response to reception of the second information, for example) if the target cell is a SCell. Alternatively and/or additionally, the UE may stop the random access procedure on the source cell (in response to initiation or completion of the mobility procedure or in response to reception of the second information, for example) if the target cell is a SCell. Alternatively and/or additionally, the UE may stop the random access procedure (in response to initiation or completion of the mobility procedure or in response to reception of the second information, for example) if the mobility procedure comprises performing a random access procedure (e.g., a random access procedure on the target cell).

In some examples, an action of the plurality of actions may comprise the UE discarding one or more random access resources (e.g., one or more explicitly signaled random access resources). For example, the UE may discard one or more random access resources (e.g., one or more explicitly signaled random access resources) of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not discard the one or more random access resources (and/or one or more second random access resources, such as one or more explicitly signaled random access resources) of the MAC entity in response to the mobility procedure (e.g., in response to initiation and/or completion of the mobility procedure) and/or in response to reception of the second information. For example, the UE may discard the one or more random access resources in response to initiation of the mobility procedure if the target cell is a non-serving cell. Alternatively and/or additionally, the UE may not discard the one or more random access resources in response to the initiation of the mobility procedure if the target cell is a SCell. In another example, the UE may discard the one or more random access resources in response to initiation of the mobility procedure if the mobility procedure comprises a random access procedure (on the target cell, for example). Alternatively and/or additionally, the UE may not discard the one or more random access resources in response to the initiation of the mobility procedure if the mobility procedure does not comprise a random access procedure. An explicitly signaled random access resource may correspond to a random access resource indicated (e.g., explicitly indicated) by a signaling received by the UE.

In some examples, an action of the plurality of actions may comprise the UE canceling one or more triggered Scheduling Requests (SRs) (and/or one or more triggered SR Procedures) of a MAC entity. For example, the UE may cancel one or more triggered SRs (and/or one or more triggered SR Procedures) of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not cancel the one or more triggered SRs (and/or the one or more triggered SR Procedures) of the MAC entity in response to the mobility procedure (e.g., in response to initiation and/or completion of the mobility procedure) and/or in response to reception of the second information. For example, the UE may cancel the one or more triggered SRs and/or the one or more triggered SR Procedures (in response to initiation or completion of the mobility procedure or in response to reception of the second information, for example) if the target cell is a non-serving cell. The UE may not cancel the one or more triggered SRs and/or the one or more triggered SR Procedures (in response to initiation and/or completion of the mobility procedure and/or in response to reception of the second information, for example) if the target cell is a SCell. In some examples, the one or more triggered SRs may comprise one, some and/or all triggered SRs of the MAC entity (and/or the one or more triggered SRs may comprise any triggered SR of the MAC entity). In some examples, the one or more triggered SR Procedures may comprise one, some and/or all triggered SR Procedures of the MAC entity (and/or the one or more triggered SR Procedures may comprise any triggered SR Procedure of the MAC entity).

In some examples, an action of the plurality of actions may comprise the UE canceling one or more triggered Buffer Status Reportings (BSRs) and/or one or more triggered BSR Procedures (of a MAC entity, for example). For example, the UE may cancel one or more triggered BSRs (and/or one or more triggered BSR Procedures) of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not cancel the one or more triggered BSRs (and/or the one or more triggered BSR Procedures) of the MAC entity in response to the mobility procedure (e.g., in response to initiation and/or completion of the mobility procedure) and/or in response to reception of the second information. For example, the UE may cancel the one or more triggered BSRs and/or the one or more triggered BSR Procedures (in response to initiation or completion of the mobility procedure or in response to reception of the second information, for example) if the target cell is a non-serving cell. The UE may not cancel the one or more triggered BSRs and/or the one or more triggered BSR Procedures (in response to initiation and/or completion of the mobility procedure and/or in response to reception of the second information, for example) if the target cell is a SCell. Alternatively, in some examples, the UE may not cancel the one or more triggered BSRs and/or the one or more triggered BSR Procedures in response to the mobility procedure (regardless of the type of the target cell, for example). In some examples, the one or more triggered BSRs may comprise one, some and/or all triggered BSRs of the MAC entity (and/or the one or more triggered BSRs may comprise any triggered BSR of the MAC entity). In some examples, the one or more triggered BSR Procedures may comprise one, some and/or all triggered BSR Procedures of the MAC entity (and/or the one or more triggered BSR Procedures may comprise any triggered BSR Procedure of the MAC entity).

In some examples, an action of the plurality of actions may comprise the UE canceling one or more triggered Sidelink BSRs (SL-BSRs) and/or one or more triggered SL-BSR Procedures. For example, the UE may cancel one or more triggered SL-BSRs (and/or one or more triggered SL-BSR Procedures) of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not cancel the one or more triggered SL-BSRs (and/or the one or more triggered SL-BSR Procedures) of the MAC entity in response to the mobility procedure (e.g., in response to initiation and/or completion of the mobility procedure) and/or in response to reception of the second information. For example, the UE may cancel the one or more triggered SL-BSRs and/or the one or more triggered SL-BSR Procedures (in response to initiation or completion of the mobility procedure or in response to reception of the second information, for example) if the target cell is a non-serving cell. The UE may not cancel the one or more triggered SL-BSRs and/or the one or more triggered SL-BSR Procedures (in response to initiation and/or completion of the mobility procedure and/or in response to reception of the second information, for example) if the target cell is a SCell. Alternatively, in some examples, the UE may not cancel the one or more triggered SL-BSRs and/or the one or more triggered SL-BSR Procedures in response to the mobility procedure (regardless of the type of the target cell, for example). In some examples, the one or more triggered SL-BSRs may comprise one, some and/or all triggered SL-BSRs of the MAC entity (and/or the one or more triggered SL-BSRs may comprise any triggered SL-BSR of the MAC entity). In some examples, the one or more triggered SL-BSR Procedures may comprise one, some and/or all triggered SL-BSR Procedures of the MAC entity (and/or the one or more triggered SL-BSR Procedures may comprise any triggered SL-BSR Procedure of the MAC entity).

In some examples, an action of the plurality of actions may comprise the UE canceling one or more triggered Power Headroom Reportings (PHRs) and/or one or more triggered PHR Procedures. For example, the UE may cancel one or more triggered PHRs (and/or one or more triggered PHR Procedures) of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not cancel the one or more triggered PHRs (and/or the one or more triggered PHR Procedures) of the MAC entity in response to the mobility procedure (e.g., in response to initiation and/or completion of the mobility procedure) and/or in response to reception of the second information. For example, the UE may cancel the one or more triggered PHRs (and/or the one or more triggered PHR Procedures) if the target cell is a non-serving cell. The UE may not cancel the one or more triggered PHRs (and/or the one or more triggered PHR Procedures) if the target cell is a SCell. In some examples, the one or more triggered PHRs may comprise one, some and/or all triggered PHRs of the MAC entity (and/or the one or more triggered PHRs may comprise any triggered PHR of the MAC entity). In some examples, the one or more triggered PHR Procedures may comprise one, some and/or all triggered PHR Procedures of the MAC entity (and/or the one or more triggered PHR Procedures may comprise any triggered PHR Procedure of the MAC entity).

In some examples, an action of the plurality of actions may comprise the UE canceling one or more triggered consistent Listen Before Talk (LBT) failures. For example, the UE may cancel one or more triggered consistent LBT failures of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not cancel the one or more triggered consistent LBT failures of the MAC entity in response to the mobility procedure (e.g., in response to initiation and/or completion of the mobility procedure) and/or in response to reception of the second information. For example, the UE may cancel the one or more triggered consistent LBT failures (in response to initiation or completion of the mobility procedure or in response to reception of the second information, for example) if the target cell is a non-serving cell. The UE may not cancel the one or more triggered consistent LBT failures (in response to initiation and/or completion of the mobility procedure and/or in response to reception of the second information, for example) if the target cell is a SCell. In some examples, the one or more triggered consistent LBT failures may comprise one, some and/or all triggered consistent LBT failures of the MAC entity (and/or the one or more triggered consistent LBT failures may comprise any triggered consistent LBT failure of the MAC entity).

In some examples, an action of the plurality of actions may comprise the UE flushing one or more soft buffers for one or more downlink Hybrid Automatic Repeat Request (HARQ) processes (e.g., all downlink HARQ processes) of a MAC entity (e.g., a MAC entity associated with the source cell). For example, the UE may flush one or more soft buffers for one or more downlink HARQ processes (e.g., all downlink HARQ processes) of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not flush the one or more soft buffers for the one or more downlink HARQ processes of the MAC entity in response to the mobility procedure (e.g., in response to initiation and/or completion of the mobility procedure) and/or in response to reception of the second information. For example, the UE may flush the one or more soft buffers for the one or more downlink HARQ processes (in response to initiation or completion of the mobility procedure or in response to reception of the second information, for example) if the target cell is a non-serving cell. The UE may not flush the one or more soft buffers for the one or more downlink HARQ processes (in response to initiation and/or completion of the mobility procedure and/or in response to reception of the second information, for example) if the target cell is a SCell. In another example, the UE may flush the one or more soft buffers for the one or more downlink HARQ processes (in response to initiation or completion of the mobility procedure or in response to reception of the second information, for example) if the mobility procedure comprises a random access procedure. The UE may not flush the one or more soft buffers for the one or more downlink HARQ processes (in response to initiation and/or completion of the mobility procedure and/or in response to reception of the second information, for example) if the mobility procedure does not comprise a random access procedure on the target cell.

In some examples, an action of the plurality of actions may comprise the UE resetting a counter of a MAC entity (e.g., the counter may be associated with beam failure indication and/or LBT failure). For example, the UE may reset a counter of a MAC entity (e.g., a MAC entity for and/or of the source cell or a MAC entity for and/or of the target cell) in response to the mobility procedure (e.g., in response to initiation or completion of the mobility procedure) or in response to reception of the second information. Alternatively, in some examples, the UE may not reset the counter of the MAC entity in response to the mobility procedure (e.g., in response to initiation and/or completion of the mobility procedure) and/or in response to reception of the second information. For example, the UE may reset the counter (in response to initiation or completion of the mobility procedure or in response to reception of the second information, for example) if the target cell is a non-serving cell. The UE may not reset the counter (in response to initiation and/or completion of the mobility procedure and/or in response to reception of the second information, for example) if the source cell is a SCell. The UE may reset the counter (in response to initiation or completion of the mobility procedure or in response to reception of the second information, for example) if the mobility procedure comprises a random access procedure on the target cell. The UE may not reset the counter (in response to initiation and/or completion of the mobility procedure and/or in response to reception of the second information, for example) if the mobility procedure does not comprise a random access procedure on the target cell.

In some examples, an action of the plurality of actions may comprise the UE applying and/or activating one or more TCI states and/or one or more beams of the target cell. For example, the UE may apply or activate one or more TCI states and/or one or more beams of the target cell in response to the mobility procedure (e.g., in response to initiation or completion of the mobility procedure) or in response to reception of the second information. Alternatively, in some examples, the UE may not apply and/or may not activate the one or more TCI states and/or the one or more beams of the target cell in response to the mobility procedure (e.g., in response to initiation and/or completion of the mobility procedure) and/or in response to reception of the second information. For example, the UE may activate the one or more TCI states and/or the one or more beams in response to initiation of the mobility procedure if the target cell is a non-serving cell. Alternatively and/or additionally, the UE may not activate or deactivate the one or more TCI states and/or the one or more beams of the target cell in response to initiation of the mobility procedure if the target cell is a SCell. The one or more TCI states and/or the one or more beams may be associated with Physical Downlink Control Channel (PDCCH), Physical Downlink Shared Channel (PDSCH), Physical Uplink Control Channel (PUCCH) and/or PUSCH associated with the target cell. The one or more TCI states and/or the one or more beams may be associated with (e.g., used for) a random access procedure and/or an uplink grant (provided by the source cell, for example) for uplink transmission to the target cell. In some examples, the one or more TCI states and/or the one or more beams may be indicated by the second information. Alternatively and/or additionally, the UE may activate or deactivate one or more TCI states and/or one or more beams indicated by the second information.

A second concept of the present disclosure is that a UE may trigger a BSR associated with a target cell in response to (and/or upon) completion of a mobility procedure associated with the target cell (and/or the UE may trigger the BSR associated with the target cell when the mobility procedure is complete). For example, the UE may trigger the BSR for transmission to the target cell.

Alternatively and/or additionally, the UE may trigger a BSR in response to (and/or upon and/or when) generating a mobility completion message (e.g., generating the mobility completion message for the target cell). Alternatively and/or additionally UE may trigger the BSR in response to (and/or upon) the mobility completion message becoming available for transmission (to the target cell, for example). Alternatively and/or additionally, the UE may trigger the BSR when the mobility completion message becomes available (and/or is available) for transmission (to the target cell, for example).

In some examples, the mobility completion message may not be associated with a logical channel (e.g., the mobility completion message may be associated with a control channel or a data channel).

In some examples, the mobility completion message may be a PUCCH signaling and/or a MAC CE.

In some examples, the mobility completion message may be generated in response to (and/or upon) completion and/or initiation of a mobility procedure (e.g., a mobility procedure to the target cell, wherein the mobility procedure may be initiated by a source cell and/or the UE). Alternatively and/or additionally, the mobility completion message may be generated when the mobility procedure is completed and/or initiated.

Alternatively and/or additionally, the UE may trigger the BSR in response to initiation of the mobility procedure. The UE may trigger the BSR in response to (and/or when and/or upon) receiving a second information, from a source cell, associated with the mobility procedure.

Alternatively and/or additionally, the UE may trigger a BSR in response to (and/or upon) the UE applying a configuration associated with BSR (e.g., the configuration may comprise BSR-Config) (and/or the UE may trigger the BSR when the UE applies the configuration associated with BSR). For example, the UE may apply the configuration associated with BSR in response to (and/or upon and/or when) completing or initiating the mobility procedure. The configuration may be associated with the target cell. The configuration may be used to configure (e.g., reconfigure) the BSR. In some examples, the configuration may not be used to disable the BSR. The configuration may be provided in the first information (e.g., the first information may be indicative of the configuration and/or the UE may be provided with the configuration via the first information).

With respect to one or more embodiments herein, such as one or more techniques, devices, concepts, methods and/or alternatives described above, completion of a mobility procedure may correspond to completion of a random access procedure associated with the mobility procedure (e.g., the mobility procedure may be completed when the random access procedure is completed). Alternatively, in some examples, the completion of the mobility procedure may correspond to a transmission of a mobility completion message (to the target cell, for example) (e.g., the mobility procedure may be completed when the UE transmits the mobility completion message). Alternatively, in some examples, the completion of the mobility procedure may correspond to a reception of an acknowledgment of the mobility completion message (from the target cell, for example) (e.g., the mobility procedure may be completed when the UE receives the acknowledgment of the mobility completion message). The completion of the mobility procedure mentioned above may correspond to and/or may be replaced by transmission of a mobility completion message.

With respect to one or more embodiments herein, the initiation of the mobility procedure may be associated with receiving a second information from a network. In some examples, the second information may be indicative of initiating the mobility procedure (e.g., the second information may instruct the UE to initiate the mobility procedure). In some examples, the second information may not be a RRC message (and/or may not comprise a RRC message and/or may not be transmitted via a RRC message). The initiation of the mobility procedure mentioned above may correspond to and/or may be replaced by receiving the second information from the source cell.

With respect to one or more embodiments herein, the mobility procedure is not a reconfiguration with sync (e.g., the mobility procedure is not a Layer-3 handover).

With respect to one or more embodiments herein, the first information may be (and/or comprise) a RRC message (e.g., a RRCReconfiguration message). Alternatively and/or additionally, the first information may be transmitted via a RRC message (e.g., a RRCReconfiguration message).

With respect to one or more embodiments herein, the second information is not a RRC signaling (and/or the second information may not comprise a RRC signaling and/or may not be transmitted via a RRC signaling). The second information may comprise (and/or may be transmitted in) a PDCCH signaling (e.g., a Downlink Control Indicator (DCI)) and/or a MAC CE.

With respect to one or more embodiments herein, the mobility procedure may comprise at least a part of a handover procedure and/or at least a part of a reconfiguration with sync procedure.

With respect to one or more embodiments herein, the mobility completion message may not comprise (and/or may not be transmitted via) a RRC message.

With respect to one or more embodiments herein, the mobility completion message comprises a MAC CE.

With respect to one or more embodiments herein, the mobility completion message may be (and/or may be transmitted via) a PUCCH transmission or a PUSCH transmission.

With respect to one or more embodiments herein, the source cell may be a serving cell (of the UE, for example) (e.g., the source cell may be a serving cell before the mobility procedure).

With respect to one or more embodiments herein, the source cell may be a PCell of the UE (e.g., the source cell may be a PCell of the UE before the mobility procedure).

With respect to one or more embodiments herein, the source cell may be a SCell of the UE. For example, the source cell may be a SCell of the UE before the mobility procedure. Alternatively and/or additionally, the source cell may be a SCell of the UE after the mobility procedure.

With respect to one or more embodiments herein, the source cell and the target cell may be in different cell groups (CGs). For example, the source cell may be in a first cell group (CG) and the target cell may be in a second cell group (CG) different than the first cell group (CG).

With respect to one or more embodiments herein, the source cell may be a source cell of the UE during the mobility procedure.

With respect to one or more embodiments herein, the target cell may be a neighboring cell (e.g., a non-serving cell, such as a cell that is not a serving cell) (e.g., the target cell may be a neighboring cell, such as a non-serving cell, before the mobility procedure).

With respect to one or more embodiments herein, the target cell may be a serving cell (e.g., a SCell). Alternatively and/or additionally, the target cell may be a deactivated cell or an activated cell. The target Cell may be a SCell of the UE before the mobility procedure (e.g., the target cell may be a SCell of the UE before initiating the mobility procedure).

With respect to one or more embodiments herein, a non-serving cell may be a neighboring cell.

With respect to one or more embodiments herein, a SCell may be a cell associated with a Master Cell group (MCG) (e.g., the SCell may be a cell in the MCG). Alternatively and/or additionally, the SCell may not be a cell associated with a Secondary Cell group (SCG) (e.g., the SCell may not be a cell in the SCG).

With respect to one or more embodiments herein, the mobility procedure may comprise the UE transmitting uplink data and/or uplink control information to the target cell. The uplink data may comprise information associated with the UE (e.g., Cell Radio Network Temporary Identifier (C-RNTI) MAC CE). The uplink data may be transmitted via PUSCH. The uplink control information may be transmitted via PUCCH.

With respect to one or more embodiments herein, the one or more uplink resources (e.g., the one or more uplink resources provided and/or configured by the source cell) may be one or more PUSCH resources.

With respect to one or more embodiments herein, the first information and the second information may be transmitted in dedicated signalings (e.g., the first information and the second information may be transmitted and/or directed only to the UE).

With respect to one or more embodiments herein, the one or more first timers and/or the one or more second timers may comprise timeAlignmentTimer, sr-ProhibitTimer, periodicBSR-Timer, retxBSR-Timer, logicalChannelSR-DelayTimer, drx-onDurationTimer, drx-InactivityTimer, drx-RetransmissionTimerDL, drx-RetransmissionTimerUL, drx-HARQ-RTT-TimerDL and/or drx-HARQ-RTT-TimerUL.

With respect to one or more embodiments herein, one, some and/or all actions in the third set of actions may be the same as one, some and/or all actions in the first set of actions. One, some and/or all actions in the second set of actions may be the same as one, some and/or all actions in the fourth set of actions. A Layer-3 Handover procedure (triggered by RRC reconfiguration with sync, for example) may comprise a UE performing all actions in the first set of actions and/or the third set of actions and performing all actions in the second set of actions and/or the fourth set of actions.

With respect to one or more embodiments herein, one, some and/or all actions in the seventh set of actions may be the same as one, some and/or all actions in the fifth set of actions. One, some and/or all actions in the sixth set of actions may be the same as one, some and/or all actions in the eighth set of actions. A Layer-3 Handover procedure (triggered by RRC reconfiguration with sync, for example) may comprise a UE performing all actions in the fifth set of actions and/or the seventh set of actions and performing all actions in the sixth set of actions and/or the eighth set of actions.

With respect to one or more embodiments herein, the mobility procedure may be triggered and/or initiated by the source cell.

With respect to one or more embodiments herein, the target cell may be a PCell of the UE in response to (and/or upon) completion of the mobility procedure (e.g., the target cell may be a PCell of the UE when and/or after the mobility procedure is completed).

With respect to one or more embodiments herein, the BSR may comprise indicating a buffer status associated with one or more uplink logical channels. The BSR may be a regular BSR. Alternatively and/or additionally, the BSR may be a SL-BSR. The BSR may indicate sidelink (SL) data status of one or more logical channels (e.g., one or more sidelink logical channels) of one or more destinations.

Throughout the present disclosure, one, some and/or all instances of the term "Buffer Status Reporting" and/or "BSR" may be replaced with "Buffer Status Report".

Throughout the present disclosure, one, some and/or all instances of the term "Power Headroom Reporting" and/or "PHR" may be replaced with "Power Headroom Report".

One, some and/or all of the foregoing techniques and/or embodiments can be formed to a new embodiment.

In some examples, embodiments disclosed herein, such as embodiments described with respect to the first concept and the second concept, may be implemented independently and/or separately. Alternatively and/or additionally, a combination of embodiments described herein, such as embodiments described with respect to the first concept and/or the second concept, may be implemented. Alternatively and/or additionally, a combination of embodiments described herein, such as embodiments described with respect to the first concept and/or the second concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

FIG. 9 is a flow chart 900 according to one exemplary embodiment from the perspective of a UE. In step 905, the UE receives a first signaling from a first cell, wherein the first signaling indicates first information of a second cell. In step 910, the UE receives a second signaling from the first cell, wherein the second signaling indicates second information of the second cell. In step 915, the UE determines whether or not to reset a MAC entity (associated with the first cell, for example) in response receiving the second signaling based on a type of the second cell (and/or based on other information in addition to the type of the second cell). In step 920, the UE performs a mobility procedure to the second cell in response to receiving the second signaling.

In one embodiment, the UE determines not to reset the MAC entity (and/or the UE does not reset the MAC entity in response to receiving the second signaling and/or in response to the mobility procedure) if the second cell is a SCell associated with the UE.

In one embodiment, the UE determines not to reset the MAC entity (and/or the UE does not reset the MAC entity in response to receiving the second signaling and/or in response to the mobility procedure) if the second cell is a SCell, of a cell group of the first cell, associated with the UE (e.g., if the second cell is a SCell, associated with the UE, that is in a cell group comprising the first cell).

In one embodiment, the UE determines to reset the MAC entity (and/or the UE resets the MAC entity in response to receiving the second signaling and/or in response to the mobility procedure) if the second cell is not a SCell of a cell group of the first cell (e.g., if the second cell is not a SCell that is in a cell group comprising the first cell).

In one embodiment, the UE determines to reset the MAC entity (and/or the UE resets the MAC entity in response to receiving the second signaling and/or in response to the mobility procedure) if the second cell is a non-serving cell of the UE.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, (iii) to determine whether to reset a MAC entity (associated with the first cell, for example) in response receiving the second signaling based on a type of the second cell (and/or based on other information in addition to the type of the second cell), and (iv) to perform a mobility procedure to the second cell in response to receiving the second signaling. Furthermore, the CPU 308 can execute the program code 312 to perform one, some and/or all of the above-described actions and steps and/or others described herein.

Figure 10:
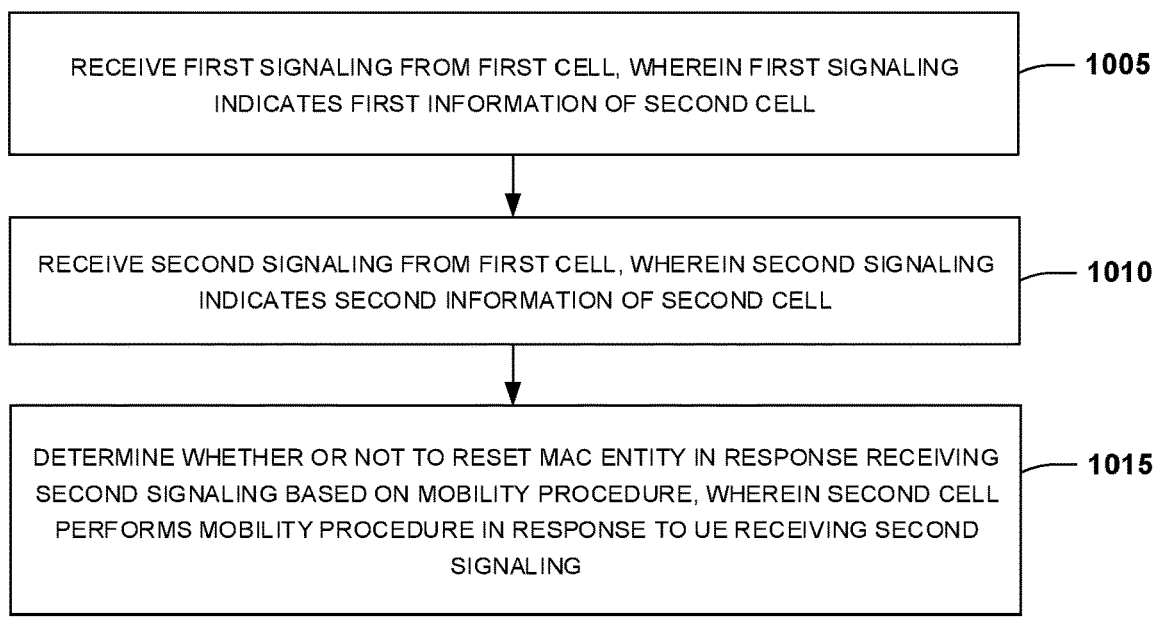
FIG. 10 is a flow chart according to one exemplary embodiment.

FIG. 10 is a flow chart 1000 according to one exemplary embodiment from the perspective of a UE. In step 1005, the UE receives a first signaling from a first cell, wherein the first signaling indicates first information of a second cell. In step 1010, the UE receives a second signaling from the first cell, wherein the second signaling indicates second information of the second cell. In step 1015, the UE determines whether or not to reset a MAC entity (associated with the first cell, for example) in response receiving the second signaling based on a mobility procedure (and/or based on other information in addition to the mobility procedure), wherein the second cell (and/or the UE) performs the mobility procedure in response to the UE receiving the second signaling. For example, the UE may determine whether or not to reset the MAC entity based on one or more contents and/or one or more actions of the mobility procedure.

In one embodiment, the UE determines to reset the MAC entity (and/or the UE resets the MAC entity in response to receiving the second signaling and/or in response to the mobility procedure) if the mobility procedure comprises performing a random access procedure on the second cell.

In one embodiment, the UE determines not to reset the MAC entity (and/or the UE does not reset the MAC entity in response to receiving the second signaling and/or in response to the mobility procedure) if the mobility procedure does not comprise performing a random access procedure on the second cell.

In one embodiment, the UE determines not to reset the MAC entity (and/or the UE does not reset the MAC entity in response to receiving the second signaling and/or in response to the mobility procedure) if the mobility procedure comprises performing an uplink transmission (e.g., the UE transmitting a third signaling comprising the uplink transmission) to the second cell via one or more uplink resources provided and/or configured by the first cell.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, and (iii) to determine whether or not to reset a MAC entity (associated with the first cell, for example) in response receiving the second signaling based on a mobility procedure (and/or based on other information in addition to the mobility procedure), wherein the second cell (and/or the UE) performs the mobility procedure in response to the UE receiving the second signaling. Furthermore, the CPU 308 can execute the program code 312 to perform one, some and/or all of the above-described actions and steps and/or others described herein.

Figure 11:
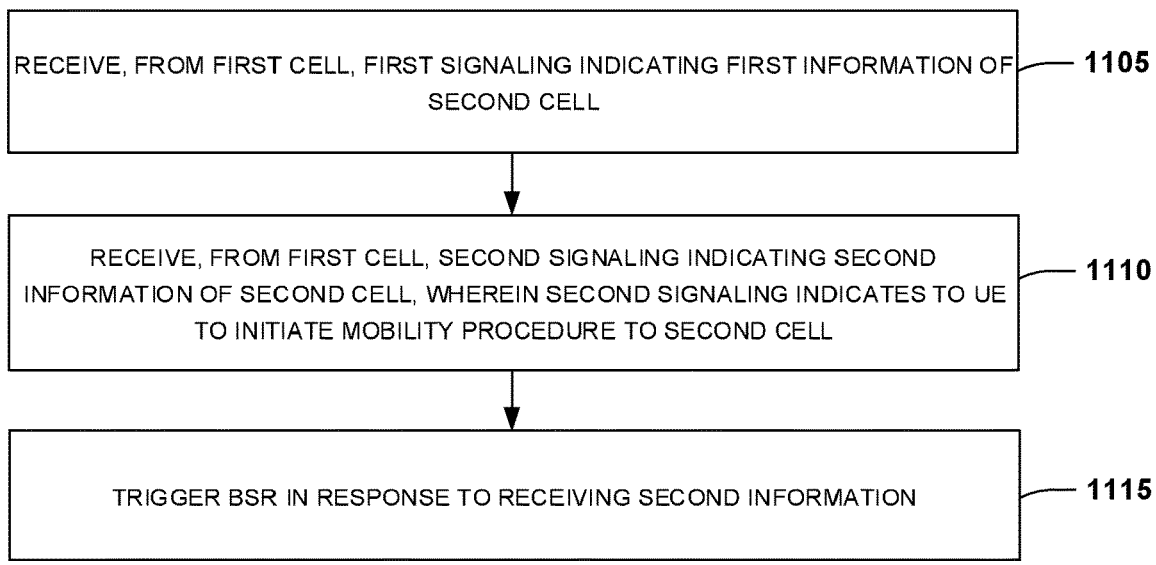
FIG. 11 is a flow chart according to one exemplary embodiment.

FIG. 11 is a flow chart 1100 according to one exemplary embodiment from the perspective of a UE. In step 1105, the UE receives, from a first cell, a first signaling indicating first information of a second cell. In step 1110, the UE receives, from the first cell, a second signaling indicating second information of the second cell, wherein the second signaling indicates to (e.g., instructs) the UE to initiate a mobility procedure to the second cell. In step 1115, the UE triggers a BSR (for the second cell, for example) in response to receiving the second information.

Referring back to FIGS. 3 and 4, in one exemplary embodiment of a UE, the device 300 includes a program code 312 stored in the memory 310. The CPU 308 may execute program code 312 to enable the UE (i) to receive, from a first cell, a first signaling indicating first information of a second cell, (ii) to receive, from the first cell, a second signaling indicating second information of the second cell, wherein the second signaling indicates to (e.g., instructs) the UE to initiate a mobility procedure to the second cell, and (iii) to trigger a BSR (for the second cell, for example) in response to receiving the second information. Furthermore, the CPU 308 can execute the program code 312 to perform one, some and/or all of the above-described actions and steps and/or others described herein.

Figure 12:
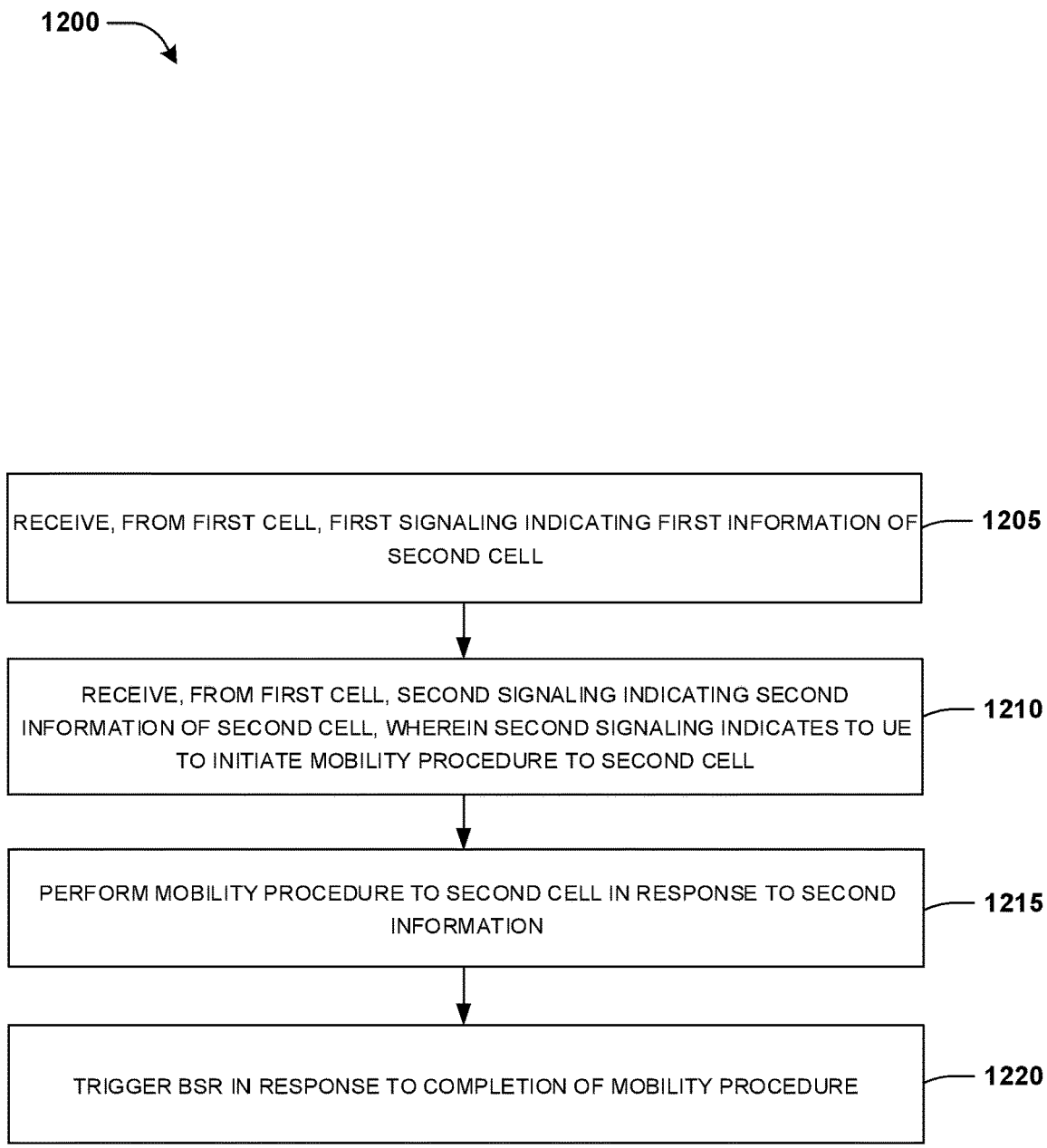
FIG. 12 is a flow chart according to one exemplary embodiment.

FIG. 12 is a flow chart 1200 according to one exemplary embodiment from the perspective of a UE. In step 1205, the UE receives, from a first cell, a first signaling indicating first information of a second cell. In step 1210, the UE receives, from the first cell, a second signaling indicating second information of the second cell, wherein the second signaling indicates to (e.g., instructs) the UE to initiate a mobility procedure to the second cell. In step 1215, the UE performs the mobility procedure to the second cell in response to the second information. In step 1220, the UE triggers a BSR (for the second cell, for example) in response to completion of the mobility procedure.

Referring back to FIGS. 3 and 4, in one exemplary embodiment of a UE, the device 300 includes a program code 312 stored in the memory 310. The CPU 308 may execute program code 312 to enable the UE (i) to receive, from a first cell, a first signaling indicating first information of a second cell, (ii) to receive, from the first cell, a second signaling indicating second information of the second cell, wherein the second signaling indicates to (e.g., instructs) the UE to initiate a mobility procedure to the second cell, (iii) to perform the mobility procedure to the second cell in response to the second information, and (iv) to trigger a BSR (for the second cell, for example) in response to completion of the mobility procedure. Furthermore, the CPU 308 can execute the program code 312 to perform one, some and/or all of the above-described actions and steps and/or others described herein.

Figure 13:
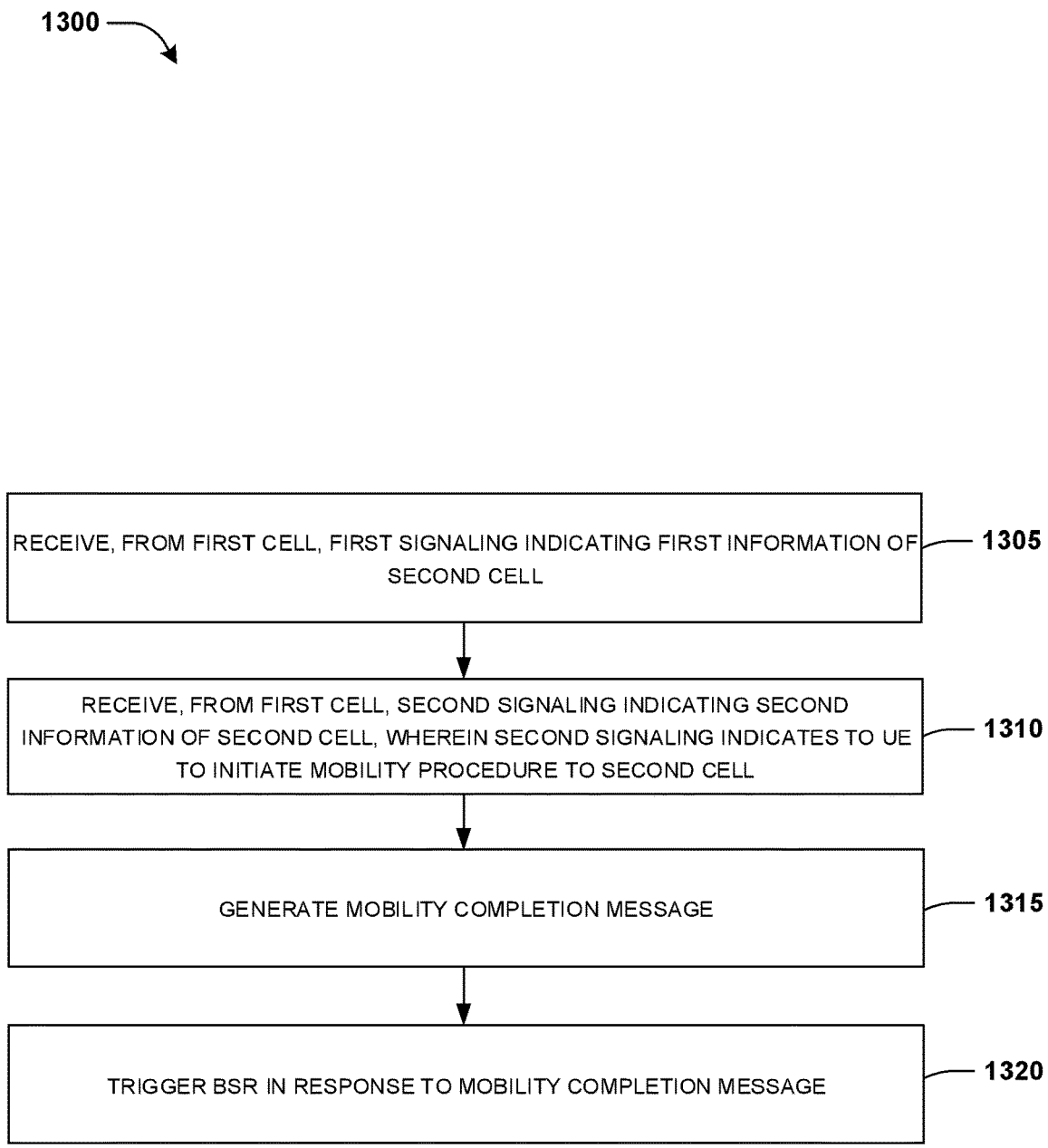
FIG. 13 is a flow chart according to one exemplary embodiment.

FIG. 13 is a flow chart 1300 according to one exemplary embodiment from the perspective of a UE. In step 1305, the UE receives, from a first cell, a first signaling indicating first information of a second cell. In step 1310, the UE receives, from the first cell, a second signaling indicating second information of the second cell, wherein the second signaling indicates to (e.g., instructs) the UE to initiate a mobility procedure to the second cell. In step 1315, the UE generates a mobility completion message. In step 1320, the UE triggers a BSR (for the second cell, for example) in response to the mobility completion message (e.g., in response to generation of the mobility completion message).

Referring back to FIGS. 3 and 4, in one exemplary embodiment of a UE, the device 300 includes a program code 312 stored in the memory 310. The CPU 308 may execute program code 312 to enable the UE (i) to receive, from a first cell, a first signaling indicating first information of a second cell, (ii) to receive, from the first cell, a second signaling indicating second information of the second cell, wherein the second signaling indicates to (e.g., instructs) the UE to initiate a mobility procedure to the second cell, (iii) to generate a mobility completion message, and (iv) to trigger a BSR (for the second cell, for example) in response to the mobility completion message. Furthermore, the CPU 308 can execute the program code 312 to perform one, some and/or all of the above-described actions and steps and/or others described herein.

With respect to FIGS. 9-13, in one embodiment, the first cell initiates and/or triggers the mobility procedure of the UE via transmitting the second signaling.

In one embodiment, the UE does not perform a mobility procedure to the second cell in response to receiving the first signaling.

In one embodiment, the mobility procedure comprises the UE performing one or more uplink transmissions transmitting a third signaling to the second cell via one or more uplink resources indicated by the first information and/or the second information. For example, the one or more uplink transmissions may be performed using the one or more uplink resources and/or the one or more uplink transmissions may comprise transmitting the third signaling to the second cell.

In one embodiment, the mobility procedure comprises the UE performing a random access procedure to the second cell.

In one embodiment, the mobility procedure comprises the UE triggering and/or generating the third signaling (e.g., the UE may trigger and/or generate the third signaling for transmission to the second cell).

In one embodiment, the third signaling is a mobility completion message.

In one embodiment, the mobility procedure includes the UE considering the second cell to be a Special Cell (SpCell) (e.g., a SpCell of the UE, such as a PCell of the UE or a Primary Secondary Cell (PSCell) of the UE).

In one embodiment, the UE considers the second cell to be a PCell in response to completion of the mobility procedure.

In one embodiment, the UE considers the second cell to be a PCell in response to reception of an acknowledgment (e.g., a positive acknowledgment), associated with the third signaling, from the second cell (e.g., the acknowledgment may be indicative of reception, such as successful reception, of the third signaling).

In one embodiment, the UE considers the second cell to be a PCell in response to completion of a random access procedure (e.g., a random access procedure associated with the mobility procedure, such as a random access procedure performed during and/or as part of the mobility procedure).

In one embodiment, the UE considers the second cell to be a PCell in response to receiving the second signaling.

In one embodiment, the UE considers the mobility procedure to be complete upon (and/or in response to) reception of an acknowledgment, associated with the third signaling, from the second cell (e.g., the acknowledgment may be indicative of reception, such as successful reception, of the third signaling).

In one embodiment, the UE considers the mobility procedure to be complete upon (and/or in response to) completion of a random access procedure associated with the mobility procedure (e.g., a random access procedure performed during and/or as part of the mobility procedure).

In one embodiment, the first signaling is a RRC message (e.g., a RRC message that is dedicated to the UE, such as a RRC message that is directed and/or transmitted to only the UE).

In one embodiment, the first signaling indicates an identity of the second cell (e.g., the first signaling may be indicative of a serving cell index of the second cell and/or a physical cell identity of the second cell).

In one embodiment, the first signaling comprises one or more uplink configurations of the second cell.

In one embodiment, the first signaling comprises one or more downlink configurations of the second cell.

In one embodiment, the first signaling comprises beam information (e.g., uplink beam information and/or downlink beam information) of the second cell.

In one embodiment, the first signaling comprises one or more cell configurations of the second cell.

In one embodiment, the first signaling comprises one or more uplink resources, of the second cell, for the UE.

In one embodiment, the second signaling is a DCI.

In one embodiment, the second signaling is not a RRC message.

In one embodiment, the second signaling is a MAC CE.

In one embodiment, the second signaling indicates an identity and/or an index of the second cell.

In one embodiment, the second signaling indicates one or more uplink resources for one or more transmissions to the second cell.

In one embodiment, the one or more uplink resources are (and/or comprise) one or more PUCCH resources and/or one or more PUSCH resources.

In one embodiment, the one or more uplink resources comprise timing advanced information for one or more uplink transmissions to the second cell.

In one embodiment, the one or more uplink resources indicates a starting frame (and/or a starting sub-frame) for one or more uplink transmissions to the second cell.

In one embodiment, the second cell is a neighboring cell of the UE.

In one embodiment, the second cell is a serving cell of the UE.

In one embodiment, the second cell is an activated serving cell of the UE.

In one embodiment, the second cell is a deactivated serving cell of the UE.

In one embodiment, the third signaling is a PUCCH transmission and/or a PUSCH transmission.

In one embodiment, the third signaling indicates a Radio Network Temporary Identifier (RNTI) value of the UE, wherein the RNTI value is provided by the first cell via the first information and/or via the second information (e.g., the first information and/or the second information may be indicative of the RNTI value).

In one embodiment, the third signaling is a SR.

In one embodiment, the third signaling is a Channel State Information (CSI) report.

In one embodiment, the third signaling is a MAC CE.

In one embodiment, the acknowledgment from the second cell is a PDCCH signaling.

Figure 14:
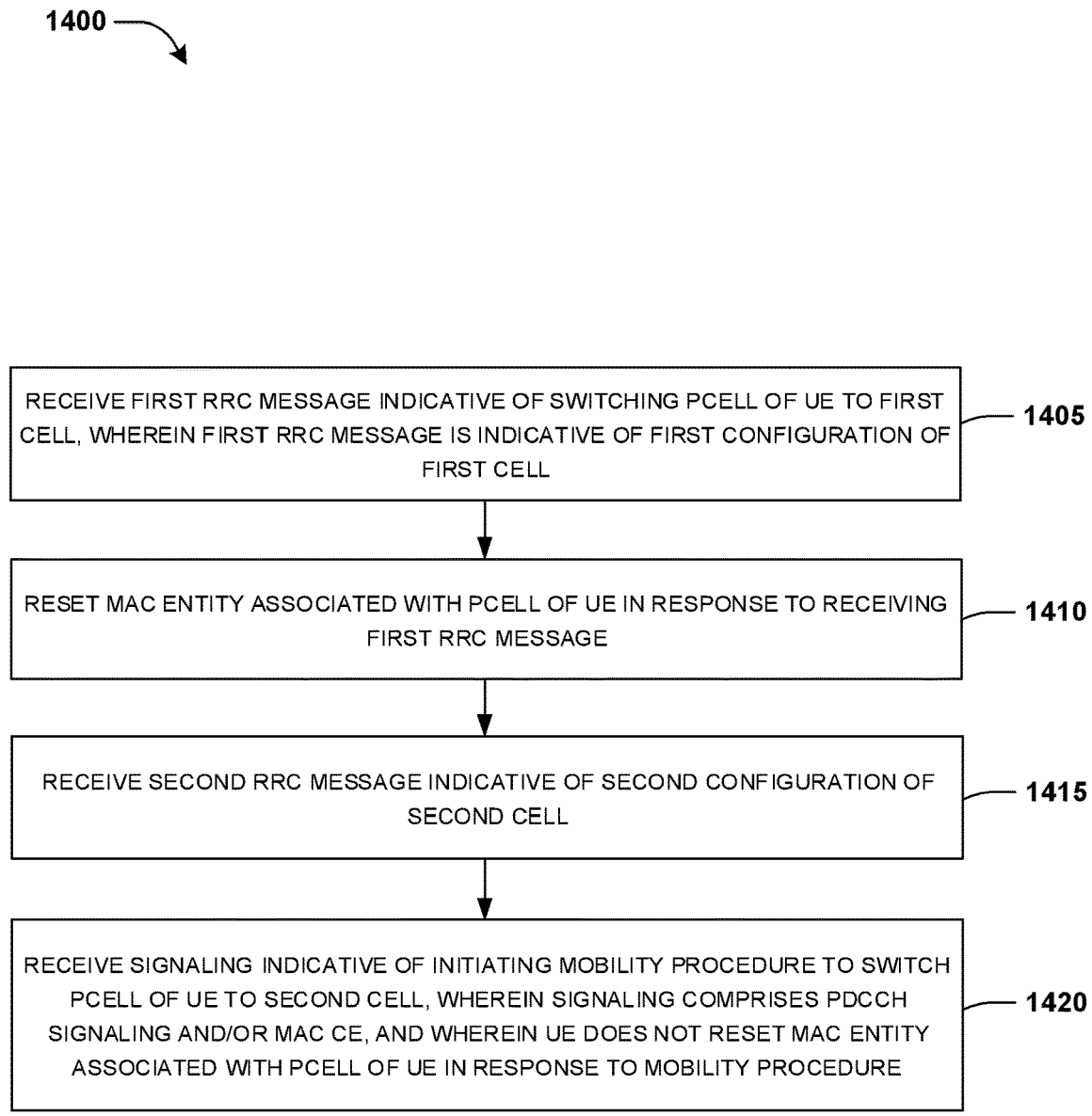
FIG. 14 is a flow chart according to one exemplary embodiment.

FIG. 14 is a flow chart 1400 according to one exemplary embodiment from the perspective of a UE. In step 1405, the UE receives a first RRC message indicative of switching a PCell of the UE to a first cell, wherein the first RRC message is indicative of a first configuration of the first cell. For example, the first RRC message may indicate to (e.g., instruct) the UE to switch the PCell of the UE to the first cell. In step 1410, the UE resets a MAC entity associated with the PCell of the UE in response to receiving the first RRC message. In step 1415, the UE receives a second RRC message indicative of a second configuration of a second cell. In step 1420, the UE receives a signaling indicative of initiating a mobility procedure to switch the PCell of the UE to the second cell. For example, the signaling may indicate to (e.g., instruct) the UE to switch the PCell of the UE to the second cell. The signaling comprises (and/or is) a PDCCH signaling (e.g., a signaling transmitted via a PDCCH) and/or a MAC CE. The UE does not reset the MAC entity associated with the PCell of the UE in response to the mobility procedure.

In one embodiment, the UE does not switch the PCell of the UE to the second cell in response to receiving the second RRC message.

In one embodiment, the UE initiates the mobility procedure in response to receiving the signaling.

In one embodiment, the UE does not reset the MAC entity in response to initiation and/or completion of the mobility procedure.

In one embodiment, the UE determines not to reset the MAC entity in response to the mobility procedure based a type of the second cell and/or based on information indicated by the signaling, wherein the UE does not reset the MAC entity in response to the mobility procedure based on the determination not to reset the MAC entity in response to the mobility procedure.

In one embodiment, the mobility procedure comprises a random access procedure on the second cell, one or more PUSCH transmissions, a TCI state activation (e.g., activation of a TCI state), and/or reception of a second signaling from the second cell.

In one embodiment, the UE initiates the mobility procedure, and the UE performs one or more actions in response to initiating the mobility procedure. In some examples, the one or more actions may comprise stopping one or more ongoing random access procedures of the MAC entity. Alternatively and/or additionally, the one or more actions may comprise discarding one or more random access resources. Alternatively and/or additionally, the one or more actions may comprise canceling one or more triggered SRs of the MAC entity. Alternatively and/or additionally, the one or more actions may comprise canceling one or more triggered BSRs of the MAC entity. Alternatively and/or additionally, the one or more actions may comprise canceling one or more triggered SL-BSRs of the MAC entity. Alternatively and/or additionally, the one or more actions may comprise canceling one or more triggered PHRs of the MAC entity. Alternatively and/or additionally, the one or more actions may comprise canceling one or more triggered consistent LBT failures of the MAC entity. Alternatively and/or additionally, the one or more actions may comprise resetting a counter of the MAC entity.

In one embodiment, the UE initiates the mobility procedure, and the UE does not perform one or more actions in response to initiation and/or completion of the mobility procedure. In some examples, the one or more actions may comprise stopping one or more first timers of the MAC entity. Alternatively and/or additionally, the one or more actions may comprise considering one or more second timers, of the MAC entity, associated with timing alignment to be expired. Alternatively and/or additionally, the one or more actions may comprise canceling one or more triggered BSRs of the MAC entity. Alternatively and/or additionally, the one or more actions may comprise canceling one or more triggered SL-BSRs of the MAC entity. Alternatively and/or additionally, the one or more actions may comprise canceling one or more triggered PHRs of the MAC entity. Alternatively and/or additionally, the one or more actions may comprise canceling one or more triggered consistent LBT failures of the MAC entity. Alternatively and/or additionally, the one or more actions may comprise flushing soft buffers for one or more downlink HARQ processes of the MAC entity.

In one embodiment, the UE initiates the mobility procedure, and the UE triggers a BSR in response to initiation and/or completion of the mobility procedure.

In one embodiment, the second cell is a SCell of the UE and/or a neighboring cell of the UE before the mobility procedure (e.g., before initiating the mobility procedure).

Referring back to FIGS. 3 and 4, in one exemplary embodiment of a UE, the device 300 includes a program code 312 stored in the memory 310. The CPU 308 may execute program code 312 to enable the UE (i) to receive a first RRC message indicative of switching a PCell of the UE to a first cell, wherein the first RRC message is indicative of a first configuration of the first cell, (ii) to reset a MAC entity associated with the PCell of the UE in response to receiving the first RRC message, (iii) to receive a second RRC message indicative of a second configuration of a second cell, and (iv) to receive a signaling indicative of initiating a mobility procedure to switch the PCell of the UE to the second cell, wherein the signaling comprises (and/or is) a PDCCH signaling and/or a MAC CE, and wherein the UE does not reset the MAC entity associated with the PCell of the UE in response to the mobility procedure. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 9-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 9-14, and/or one, some and/or all of the above-described actions and steps and/or others described herein.

It may be appreciated that applying one or more of the techniques presented herein may result in one or more benefits including, but not limited to, increased efficiency and/or increased speed of communication between devices (e.g., a UE and/or a network node). The increased efficiency and/or increased speed may be a result of enabling the UE to handle Layer-1 and/or Layer-2 (L1/L2) mobility procedures using one or more of the techniques provided herein (e.g., using one or more of the configurations and/or one or more of the procedures provided herein). Alternatively and/or additionally, the increased efficiency and/or increased speed may be due to reducing latency for performing handover via Layer-1 and/or Layer-2 (L1/L2) mobility procedures.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   receiving a first Radio Resource Control (RRC) message indicative of a first configuration of a first cell; and
   receiving a signaling indicative of initiating a mobility procedure to switch a Primary Cell (PCell) of the UE to the first cell, wherein:
     the signaling comprises at least one of a Physical Downlink Control Channel (PDCCH) signaling or a Medium Access Control (MAC) Control Element (CE); and
     the UE performs a first action and does not perform a second action for a MAC entity associated with the PCell of the UE in response to the mobility procedure,
   wherein the first action comprises at least one of:
     stopping one or more ongoing random access procedures of the MAC entity; or
     canceling one or more triggered consistent Listen Before Talk (LBT) failures of the MAC entity,
   wherein the second action comprises at least one of:
     stopping one or more first timers of the MAC entity;
     considering one or more second timers, of the MAC entity, associated with timing alignment to be expired;
     canceling one or more triggered Buffer Status Reportings (BSRs) of the MAC entity; or
     canceling one or more triggered Sidelink BSRs (SL-BSRs) of the MAC entity.

2. The method of claim 1, wherein:
   the UE does not switch the PCell of the UE to the first cell in response to receiving the first RRC message.

3. The method of claim 1, comprising:
   initiating the mobility procedure in response to receiving the signaling.

4. The method of claim 1, comprising:
   receiving a second RRC message indicative of switching the PCell of the UE to a second cell, wherein the second RRC message is indicative of a second configuration of the second cell; and
   resetting the MAC entity associated with the PCell of the UE in response to receiving the second RRC message, wherein the resetting the MAC entity comprises performing the first action and the second action.

5. The method of claim 1, comprising:
   determining not to perform the second action for the MAC entity in response to the mobility procedure based on at least one of a type of the first cell or information indicated by the signaling, wherein the UE does not perform the second action for the MAC entity in response to the mobility procedure based on the determination not to perform the second action for the MAC entity in response to the mobility procedure.

6. The method of claim 1, wherein the mobility procedure comprises at least one of:
   a random access procedure on the first cell;
   one or more Physical Uplink Shared Channel (PUSCH) transmissions;
   a Transmission Configuration Indicator (TCI) state activation; or
   reception of a second signaling from the first cell.

7. The method of claim 1, wherein the first action comprises at least one of:
   discarding one or more random access resources;
   canceling one or more triggered Scheduling Requests (SRs) of the MAC entity;

canceling one or more triggered Power Headroom Reportings (PHRs) of the MAC entity;
flushing soft buffers for one or more downlink Hybrid Automatic Repeat Request (HARQ) processes of the MAC entity; or
resetting a counter of the MAC entity.

8. The method of claim 1, wherein the second action comprises at least one of:
canceling one or more triggered Scheduling Requests (SRs) of the MAC entity;
cancelling one or more triggered Power Headroom Reportings (PHRs) of the MAC entity; or
flushing soft buffers for one or more downlink Hybrid Automatic Repeat Request (HARQ) processes of the MAC entity.

9. The method of claim 1, comprising:
initiating the mobility procedure; and
in response to at least one of initiating the mobility procedure or completion of the mobility procedure, triggering a BSR.

10. The method of claim 1, wherein:
before the mobility procedure, the first cell is at least one of a Secondary Cell (SCell) of the UE or a neighboring cell of the UE.

11. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
receiving a first Radio Resource Control (RRC) message indicative of a first configuration of a first cell; and
receiving a signaling indicative of initiating a mobility procedure to switch a Primary Cell (PCell) of the UE to the first cell, wherein:
the signaling comprises at least one of a Physical Downlink Control Channel (PDCCH) signaling or a Medium Access Control (MAC) Control Element (CE); and
the UE performs a first action and does not perform a second action for a MAC entity associated with the PCell of the UE in response to the mobility procedure,
wherein the first action comprises at least one of:
stopping one or more ongoing random access procedures of the MAC entity; or
canceling one or more triggered consistent Listen Before Talk (LBT) failures of the MAC entity,
wherein the second action comprises at least one of:
stopping one or more first timers of the MAC entity;
considering one or more second timers, of the MAC entity, associated with timing alignment to be expired;
canceling one or more triggered Buffer Status Reportings (BSRs) of the MAC entity; or
canceling one or more triggered Sidelink BSRs (SL-BSRs) of the MAC entity.

12. The UE of claim 11, wherein:
the UE does not switch the PCell of the UE to the first cell in response to receiving the first RRC message.

13. The UE of claim 11, wherein:
before the mobility procedure, the first cell is at least one of a Secondary Cell (SCell) of the UE or a neighboring cell of the UE.

14. The UE of claim 11, the operations comprising:
receiving a second RRC message indicative of switching the Cell of the UE to a second cell, wherein the second RRC message is indicative of a second configuration of the second cell; and
resetting the MAC entity associated with the PCell of the UE in response to receiving the second RRC message, wherein the resetting the MAC entity comprises performing the first action and the second action.

15. The UE of claim 11, the operations comprising:
determining not to perform the second action for the MAC entity in response to the mobility procedure based on at least one of a type of the first cell or information indicated by the signaling, wherein the UE does not perform the second action for the MAC entity in response to the mobility procedure based on the determination not to perform the second action for the MAC entity in response to the mobility procedure.

16. The UE of claim 11, wherein the mobility procedure comprises at least one of:
a random access procedure on the first cell;
one or more Physical Uplink Shared Channel (PUSCH) transmissions;
a Transmission Configuration Indicator (TCI) state activation; or
reception of a second signaling from the first cell.

17. The UE of claim 11, wherein the first action comprises at least one of:
discarding one or more random access resources;
canceling one or more triggered Scheduling Requests (SRs) of the MAC entity;
canceling one or more triggered Power Headroom Reportings (PHRs) of the MAC entity;
flushing soft buffers for one or more downlink Hybrid Automatic Repeat Request (HARQ) processes of the MAC entity; or
resetting a counter of the MAC entity.

18. The UE of claim 11, wherein the second action comprises at least one of:
canceling one or more triggered Scheduling Requests (SRs) of the MAC entity;
canceling one or more triggered Power Headroom Reportings (PHRs) of the MAC entity; or
flushing soft buffers for one or more downlink Hybrid Automatic Repeat Request (HARQ) processes of the MAC entity.

19. The UE of claim 11, the operations comprising:
initiating the mobility procedure; and
in response to at least one of initiating the mobility procedure or completion of the mobility procedure, triggering a BSR.

20. A non-transitory computer-readable medium comprising processor-executable instructions that when executed by a User Equipment (UE) cause performance of operations, the operations comprising:
receiving a first Radio Resource Control (RRC) message indicative of a first configuration of a first cell; and
receiving a signaling indicative of initiating a mobility procedure to switch a Primary Cell (PCell) of the UE to the first cell, wherein:
the signaling comprises at least one of a Physical Downlink Control Channel (PDCCH) signaling or a Medium Access Control (MAC) Control Element (CE); and the UE performs a first action and does not perform a second action for a MAC entity associated with the PCell of the UE in response to the mobility procedure, wherein the first action comprises at least one of:
- stopping one or more ongoing random access procedures of the MAC entity; or
- canceling one or more triggered consistent Listen Before Talk (LBT) failures of the MAC entity, wherein the second action comprises at least one of:
- stopping one or more first timers of the MAC entity;
- considering one or more second timers, of the MAC entity, associated with timing alignment to be expired;
- canceling one or more triggered Buffer Status Reportings (BSRs) of the MAC entity; or
- canceling one or more triggered Sidelink BSRs (SL-BSRs) of the MAC entity.

\* \* \* \* \*